United States Patent
Ito et al.

(10) Patent No.: US 8,201,652 B2
(45) Date of Patent: Jun. 19, 2012

(54) WORK VEHICLE

(75) Inventors: Tomoki Ito, Wako (JP); Koichi Azuma, Wako (JP); Tomomi Nakaya, Wako (JP); Masayuki Sasaoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 390 days.

(21) Appl. No.: 12/625,160

(22) Filed: Nov. 24, 2009

(65) Prior Publication Data

US 2010/0126788 A1 May 27, 2010

(30) Foreign Application Priority Data

Nov. 26, 2008 (JP) ................. 2008-301324

(51) Int. Cl.
*B60K 15/10* (2006.01)
*B62D 51/04* (2006.01)
*A01B 33/00* (2006.01)
*B60P 3/00* (2006.01)

(52) U.S. Cl. .......... 180/69.5; 180/19.1; 172/41; 172/42; 220/562

(58) Field of Classification Search .............. 180/69.5, 180/19.1, 19.2, 19.3, 53.1; 123/193.2; 172/41, 172/42; 56/1, 2, 16.7, 320.1; 220/562
See application file for complete search history.

(56) References Cited

U.S. PATENT DOCUMENTS

| | | | | |
|---|---|---|---|---|
| 5,515,997 | A * | 5/1996 | Kirk et al. ................ | 220/562 |
| 5,931,335 | A * | 8/1999 | Cippitani ................ | 220/724 |
| 6,257,360 | B1 * | 7/2001 | Wozniak et al. ........... | 180/69.5 |
| 6,766,866 | B2 * | 7/2004 | Miyahara et al. ........... | 172/41 |
| 8,066,081 | B2 * | 11/2011 | Ito et al. .................... | 172/42 |
| 8,074,618 | B2 * | 12/2011 | Kobayashi ............ | 123/195 A |
| 2004/0026427 | A1 * | 2/2004 | Shigematsu ............ | 220/562 |
| 2009/0078706 | A1 * | 3/2009 | Ishitoya et al. ........... | 220/562 |

FOREIGN PATENT DOCUMENTS

JP 11-170876 A 6/1999

* cited by examiner

*Primary Examiner* — J. Allen Shriver, II
*Assistant Examiner* — James M Dolak
(74) *Attorney, Agent, or Firm* — Arent Fox LLP

(57) ABSTRACT

A work vehicle includes an engine driven by gas fuel sealed inside a cassette gas cylinder. The cassette gas cylinder is installed in a cylinder mount. The cylinder mount comprises a mouthpiece support for supporting a mouthpiece of the cassette gas cylinder, and a shutter member swingable about a support shaft provided to the cylinder mount, for opening and closing an opening of the mouthpiece support from above the mouthpiece support.

5 Claims, 18 Drawing Sheets

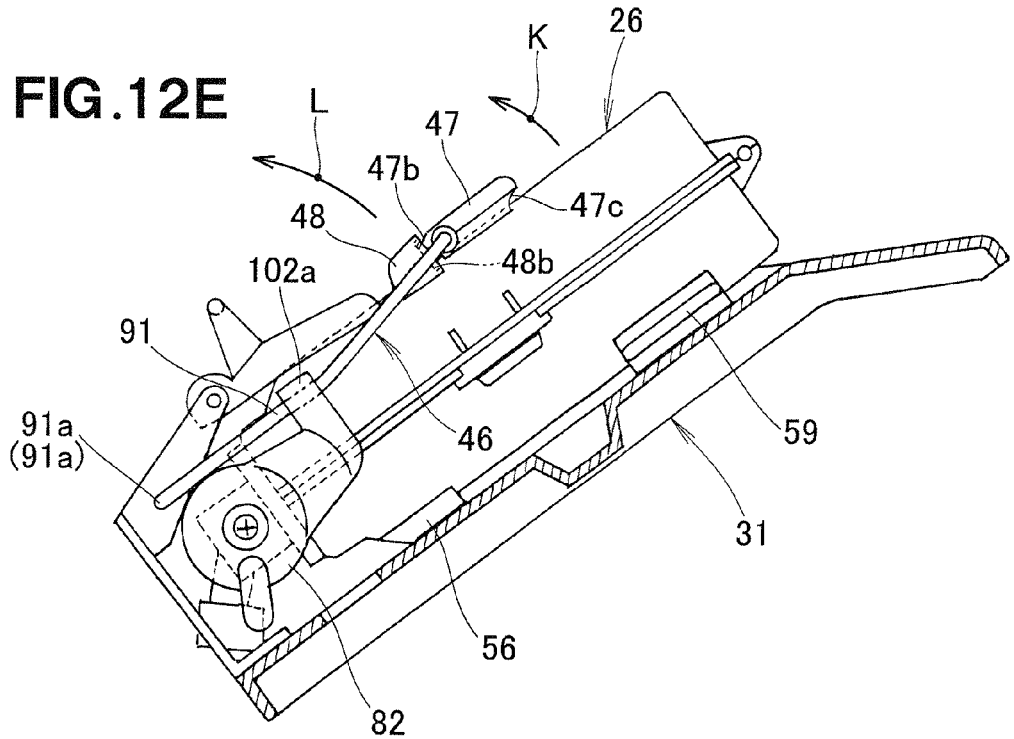
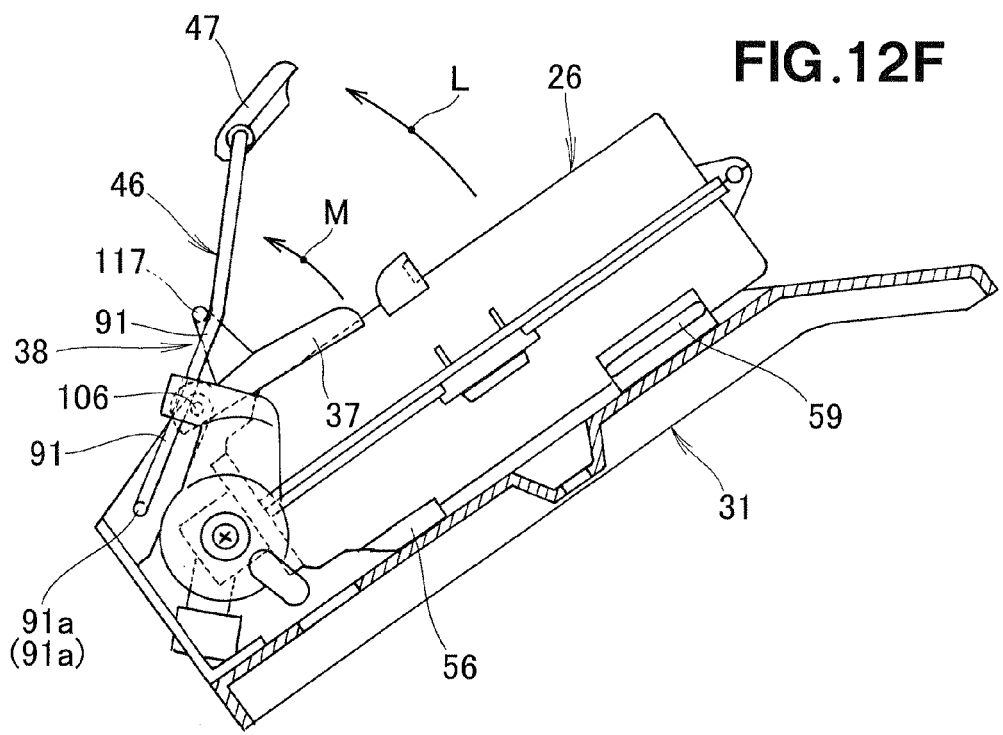

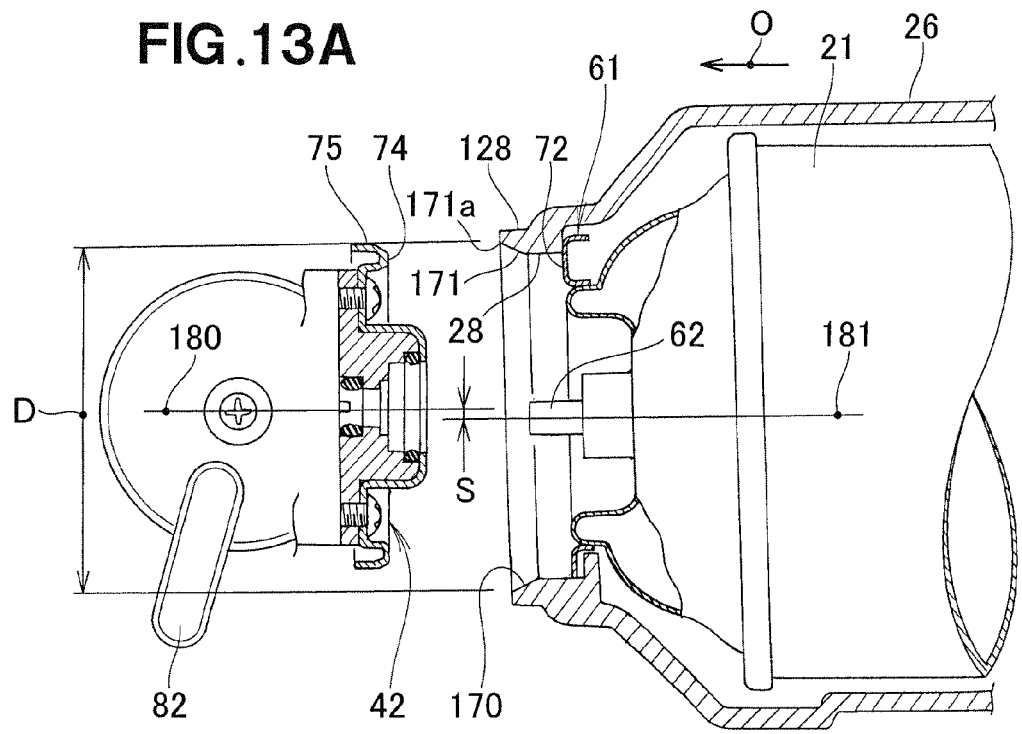
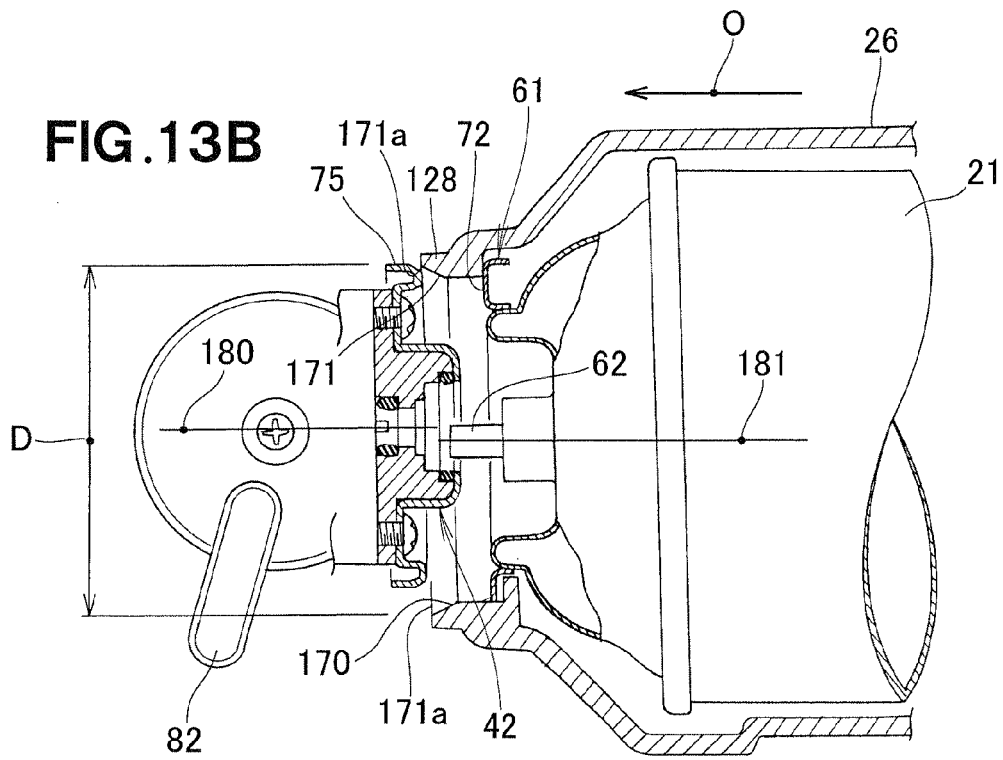

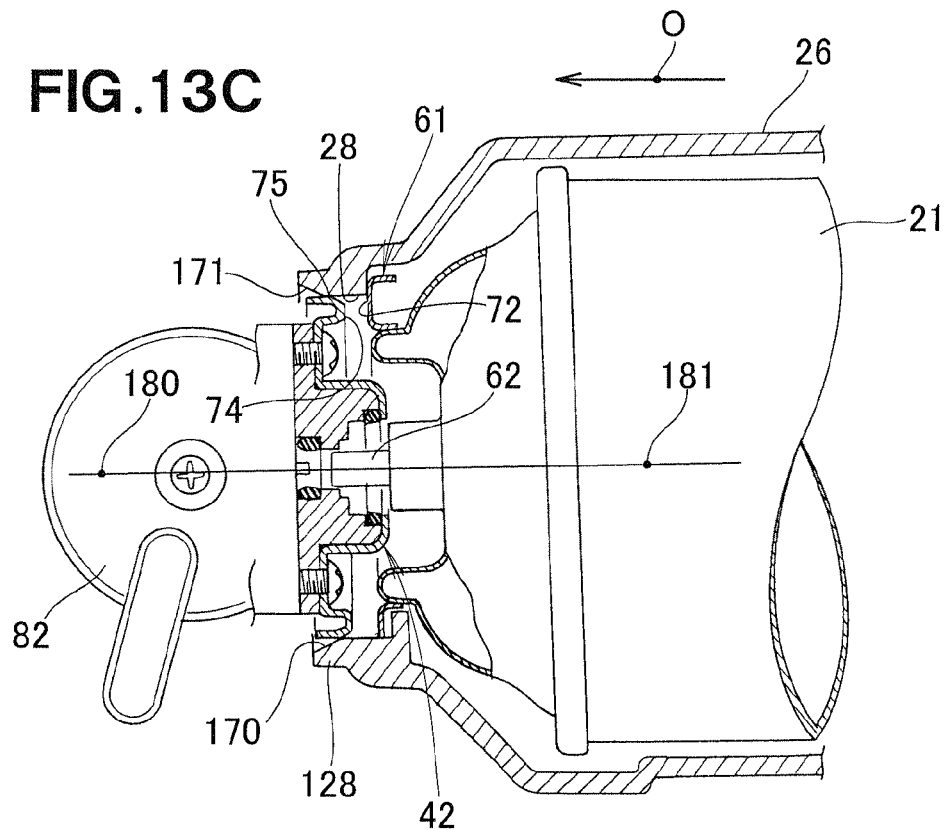
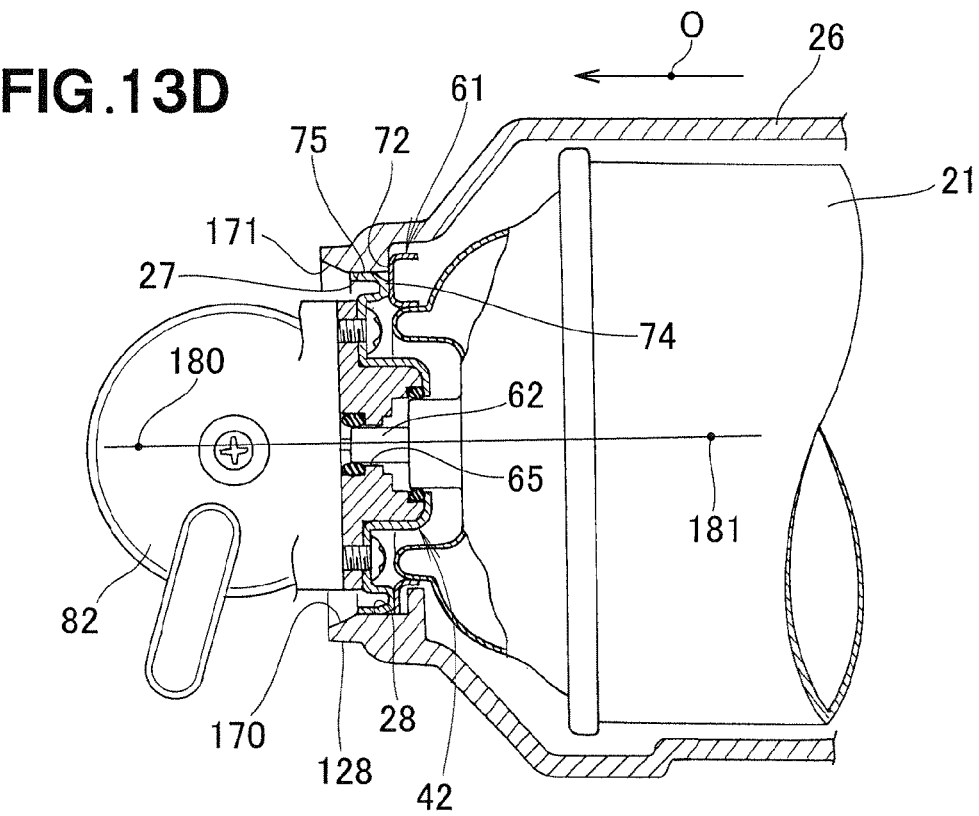

WORK VEHICLE

FIELD OF THE INVENTION

The present invention relates to a work vehicle in which a cassette gas cylinder is installed in a cylinder mount, and an engine is driven by fuel supplied from the cassette gas cylinder.

BACKGROUND OF THE INVENTION

Known examples of work vehicles include a gas-engine work vehicle, wherein a gas engine is installed in a work vehicle body, a handle base extends rearward from the work vehicle body, the handle base is provided with a hollow housing part for housing a cassette gas cylinder, a gas cylinder cover for closing the hollow housing part is provided, and the engine is driven by fuel gas supplied from the cassette gas cylinder, as is disclosed in Japanese Patent Application Laid-Open Publication No. 11-170876 (JP 11-170876 A), for example.

In the gas-engine work vehicle disclosed in JP 11-170876 A, a mouthpiece support for supporting a mouthpiece of the cassette gas cylinder is provided in the hollow housing part. This mouthpiece support is provided with a nozzle receiver for receiving an injection nozzle of the mouthpiece.

When the gas-engine work vehicle is not being used, the mouthpiece of the cassette gas cylinder is removed from the mouthpiece support, and the cassette gas cylinder is stored as removed from the hollow housing part. Therefore, it is believed that while the gas-engine work vehicle is being stored, dirt and other impurities enter the hollow housing part, and the entered impurities will penetrate into (adhere to) the nozzle receiver of the mouthpiece support.

As a countermeasure, a highly hermetic structure has been proposed for the entire hollow housing part.

However, the hollow housing part is a comparatively large space, and it is extremely difficult to make the entire hollow housing part into a highly hermetic structure. Therefore, there is a danger that dirt and other impurities will penetrate into (adhere to) the nozzle receiver (the mouthpiece support) while the work vehicle is in storage.

SUMMARY OF THE INVENTION

It is therefore an object of the present invention to provide a work vehicle wherein dirt and other impurities can be prevented from penetrating into (adhering to) the mouthpiece support.

According to an aspect the present invention, there is provided a work vehicle comprising a cassette gas cylinder, a cylinder mount in which the cassette gas cylinder is installed, and an engine driven by fuel supplied from the cassette gas cylinder, wherein the cylinder mount comprises a mouthpiece support for supporting a mouthpiece of the cassette gas cylinder, and a shutter member, designed to swing vertically about a support shaft provided to the cylinder mount, for opening and closing an opening in the mouthpiece support from above the mouthpiece support.

Thus, the work vehicle of the present invention comprises a shutter member for opening and closing the opening of the mouthpiece support from above. When the shutter member is in this closed state, the back surface of the shutter member is brought in contact with the mouthpiece support, and the opening of the mouthpiece support is closed. Dirt and other impurities can thereby be prevented from penetrating into (adhering to) the mouthpiece support.

When the shutter member is in an open state, the front surface of the shutter member faces upward, and the back surface of the shutter member faces downward. Facing the back surface of the shutter member downward makes it possible to prevent sand, dust, and other impurities from being retained on the back surface of the shutter member. It is thereby possible to prevent sand, dust, and other impurities from penetrating into the mouthpiece support when the mouthpiece support is closed by the back surface of the shutter member. Therefore, dirt and other impurities can be more satisfactorily prevented from penetrating into (adhering) to the mouthpiece support.

It is preferred that the cylinder mount further comprise cylinder-holding means capable of switching the cassette gas cylinder between a held state and a released state, and shutter-interlocking means designed so as to switch the shutter member to an opened state in conjunction with an operation of the cylinder-holding means when the cassette gas cylinder is switched from a held state to a released state. As a result, the procedure of switching the shutter member to an open state can be omitted, and usability can be improved.

It is preferred that the shutter-interlocking means comprise a locking member capable of locking with the cylinder-holding means disposed in a cassette-gas-cylinder holding position, wherein the locking member locks with the cylinder-holding means, whereby the shutter member is switched to an open state in conjunction with the operation of the cylinder-holding means when the cassette gas cylinder is switched from the held state to the released state. With this arrangement, it is possible to switch the shutter member to an open state in conjunction with the operation cylinder-holding means in a simple configuration merely comprising an elastic member and a locking member.

It is preferred that the cylinder mount comprise a support bracket for supporting the cylinder-holding means, and holding force generators obtained by making part of the support bracket elastically deformable, wherein creating elastic deformation in the holding force generators causes holding force to be created for holding the cassette gas cylinder in the cylinder mount. Therefore, creating elastic deformation in the holding force generators can generate force (hereinbelow referred to as "return force") for returning the holding force generators to their state prior to deformation. The return force of the holding force generators thereby acts on the cassette gas cylinder, making it possible to absorb manufacturing tolerance, assembly tolerance, or the like and to reliably hold the cassette gas cylinder.

Furthermore, part of the support bracket (i.e., the holding force generators) can also be used as an elastically deforming part, and the spring member needed in order to hold the cassette gas cylinder can be dispensed with. The number of components can thereby be reduced, the configuration can be simplified, and costs can be curtailed.

It is preferred that the cassette gas cylinder be designed to be housed in a gas cylinder case, the cylinder case being divided into a pair of cases, that he pair of cases be linked in an openable and closeable manner by a hinge pin of a hinge provided to the pair of cases, and that the hinge have stoppers for preventing the hinge pin from falling out. Therefore, the hinge pin can be prevented from falling out of the hinge, and usability can be improved.

BRIEF DESCRIPTION OF THE DRAWINGS

Certain preferred embodiments of the present invention will be described in detail below, by way of example only, with reference to the accompanying drawings, in which:

FIGS. 12E, 12F, and 12G are views showing an example in which the holding rod of the receiver mechanism is removed from the gas cylinder case;

FIGS. 13A through 13D are views showing the gas cylinder case as being mounted to the mouthpiece support.

DESCRIPTION OF THE PREFERRED EMBODIMENTS

In the present embodiment, a walk-behind tiller is presented as an example of a work vehicle, but the work vehicle is not limited to a walk-behind tiller.

Figure 1:
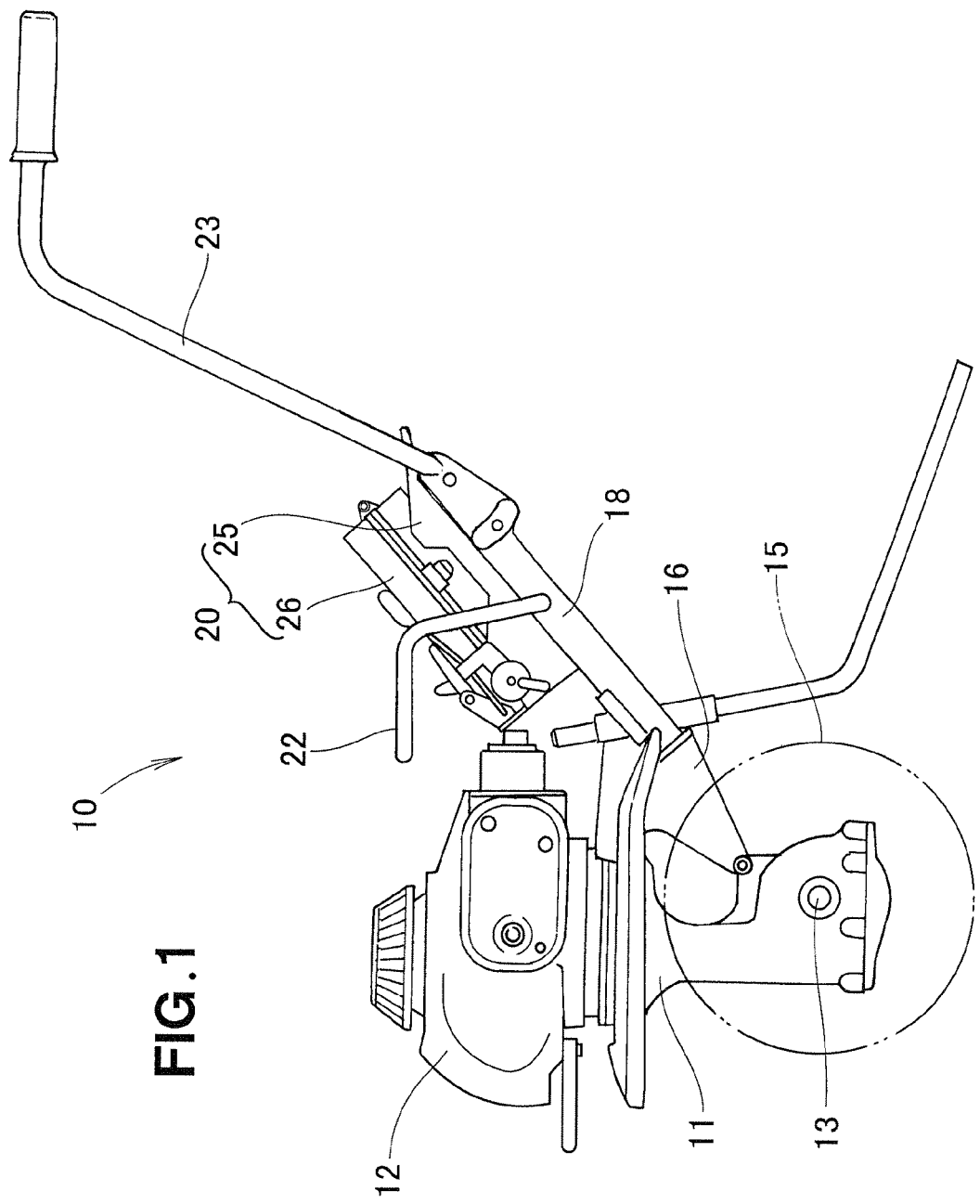
FIG. 1 is a side view showing a work vehicle according to an embodiment of the present invention.

A work vehicle 10 shown in FIG. 1 is a walk-behind tiller comprising a gas engine (engine) 12 installed at the top end of a work vehicle body 11, a till axle 13 provided below the gas engine 12, a plurality of till pawls 15 provided to the till axle 13, a support bracket 16 provided to the work vehicle body 11, a handle column 18 extending backward and upward from the support bracket 16, a cassette gas cylinder attachment structure 20 provided to the handle column 18, a cassette gas cylinder 21 (see FIG. 9) mounted to the cassette gas cylinder attachment structure 20, a carry handle 22 for transportation provided to the periphery of the cassette gas cylinder attachment structure 20, and an operation handle 23 provided at the top end of the handle column 18.

The work vehicle 10 is a walk-behind tiller which travels while tilling soil with the till pawls 15, by the transmission of power from the gas engine 12 to the till axle 13 and by the rotation of the till axle 13.

The gas engine 12 is driven by the supply of liquid fuel gas (hereinbelow referred to as fuel) supplied from the cassette gas cylinder 21.

Figure 2:
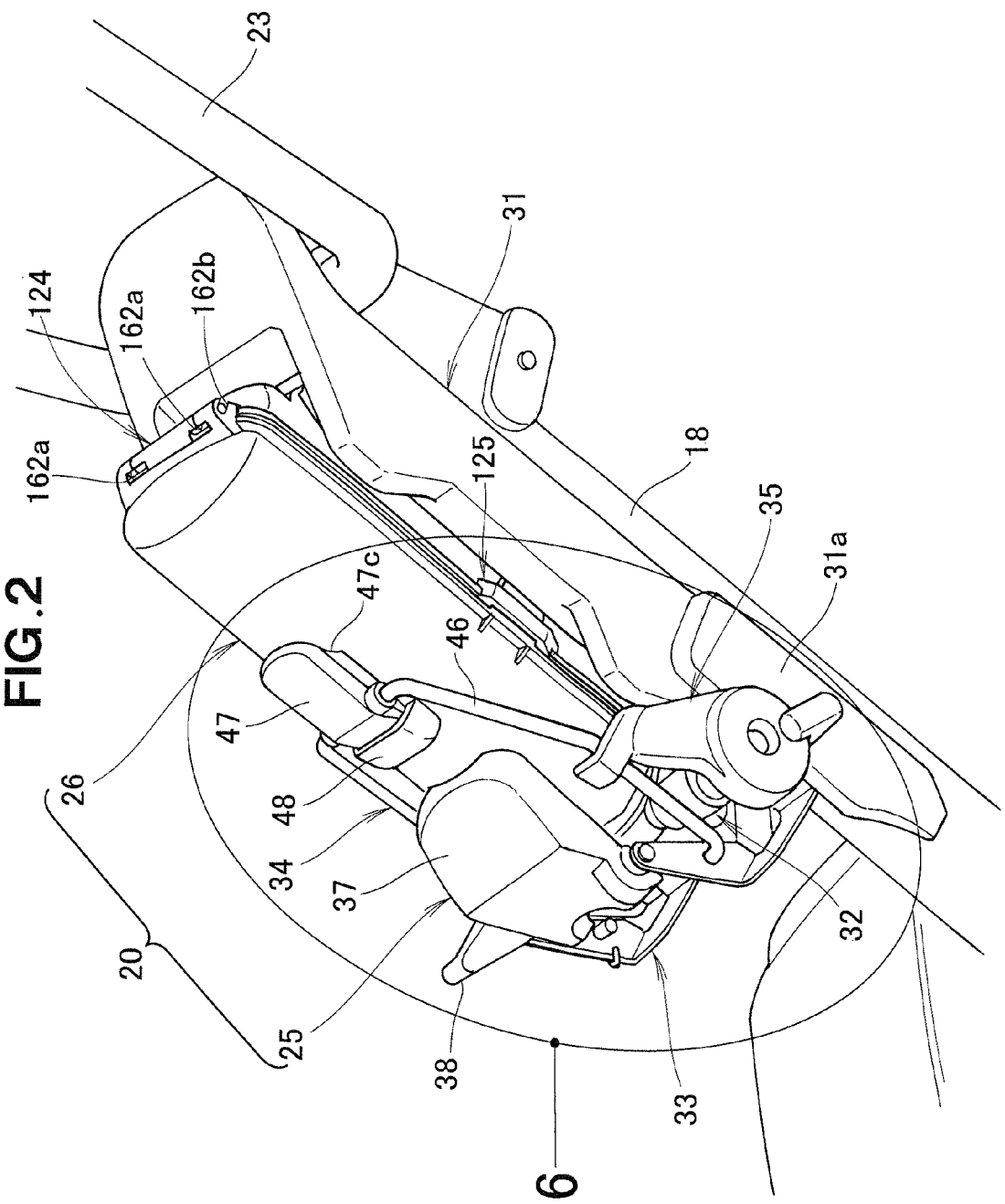
FIG. 2 is a perspective view of the cassette gas cylinder attachment structure of FIG. 1.
Figure 3:
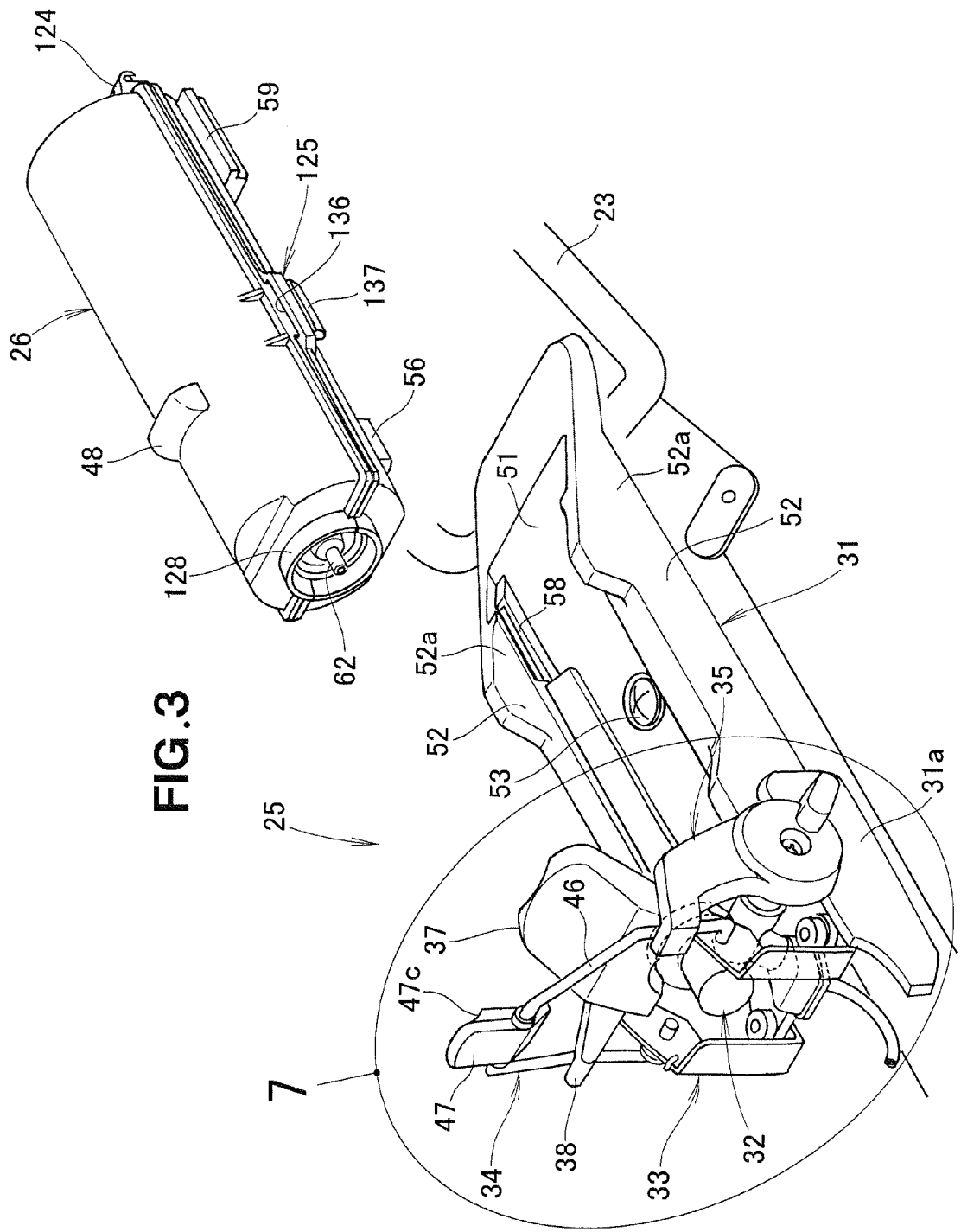
FIG. 3 is a perspective view showing the gas cylinder case as having been removed from the cassette gas cylinder attachment structure of FIG. 2.

According to FIGS. 2 and 3, the cassette gas cylinder attachment structure 20 comprises a receiver mechanism (cylinder mount) 25 provided to the handle column 18, and a gas cylinder case (cylinder case) 26 detachably provided to the receiver mechanism 25.

The receiver mechanism 25 is configured to allow installation of the cassette gas cylinder 21 by installing the gas cylinder case 26 for housing the cassette gas cylinder 21.

The receiver mechanism 25 comprises a receiver body 31 provided to the handle column 18, a mouthpiece support/switching valve 32 provided to a distal end 31a of the receiver body 31, a support bracket 33 provided to the distal end 31a of the receiver body 31, a case-holding means (cylinder-holding means) 34 provided to the support bracket 33, valve-interlocking means 35 for interlocking a switching valve 43 (see FIG. 4) of the mouthpiece support/switching valve 32 with the case-holding means 34, a shutter member 37 provided to the support bracket 33, and shutter-interlocking means 38 for interlocking the shutter member 37 with the case-holding means 34.

In the receiver mechanism 25, a holding rod 46 of the case-holding means 34 is disposed in a holding position (the position shown in FIG. 2), and a locking fastener 47 of the holding rod 46 is locked to a catch 48 of the gas cylinder case 26, whereby the gas cylinder case 26 can be held in the receiver mechanism 25.

The cassette gas cylinder 21 is held in a state of being mounted on the work vehicle 10 by the gas cylinder case 26 being held in the receiver mechanism 25.

The gas cylinder case 26 can be removed from the receiver mechanism 25 by removing the holding rod 46 from the catch 48 and placing the rod in an open position (the position shown in FIG. 3).

The receiver body 31 comprises a bottom part 51, and left and right side walls 52, 52, as shown in FIG. 3. The front end and center parts of the bottom part 51 are attached to the handle column 18 by bolts 53 (only the bolt 53 of the center part is shown in FIG. 3). By securing the receiver body 31 with bolts, the receiver body 31 is provided at a downward incline toward the front of the vehicle body along the handle column 18.

Left and right slider guides 58 (only the right slider guide 58 is shown in FIG. 3) are formed on the respective rear ends 52a of the left and right side walls 52, 52. The left and right slider guides 58 are guiding grooves for guiding left and right sliders 59 (see FIG. 10 for the left slider 59) provided to the gas cylinder case 26.

Figure 4:
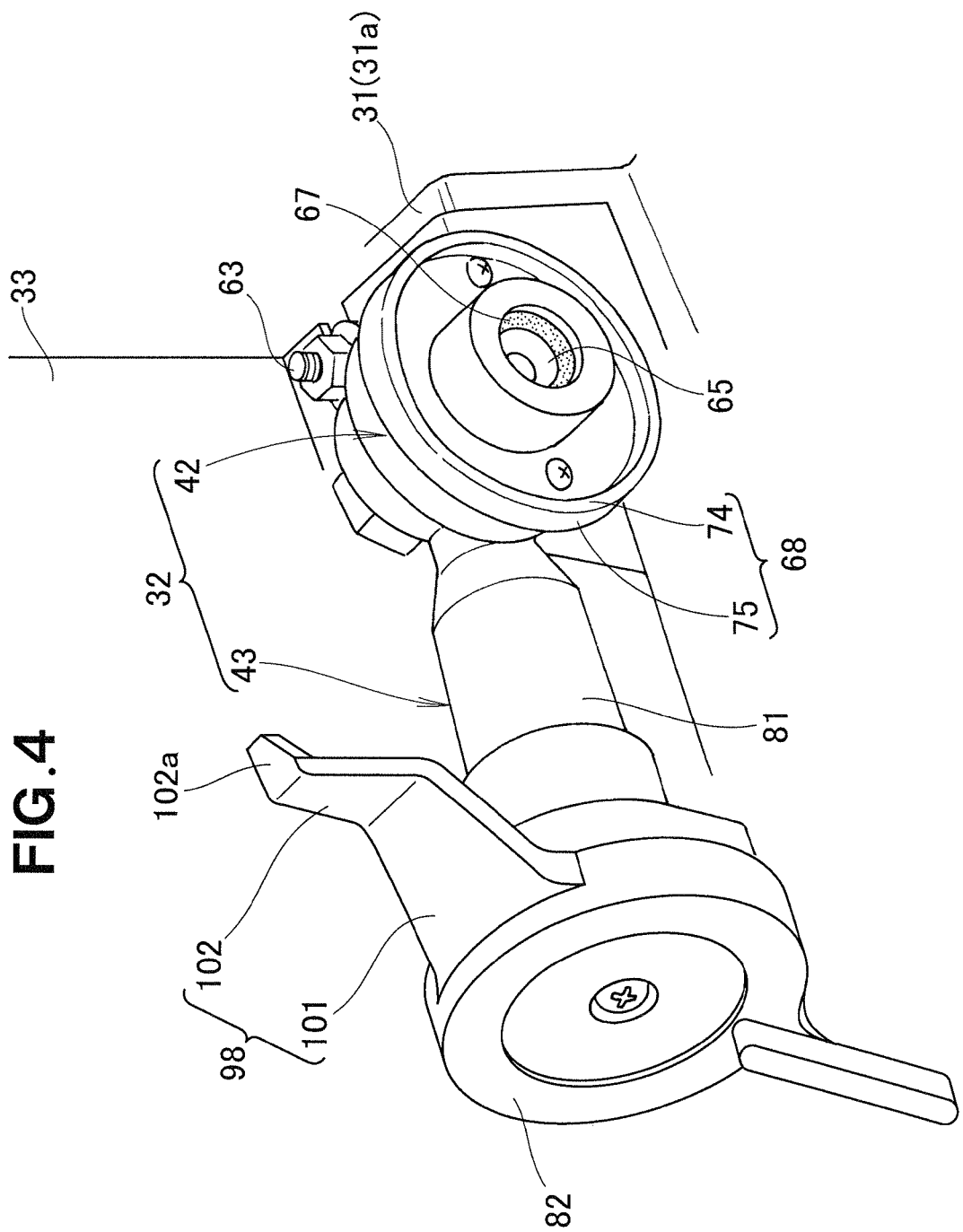
FIG. 4 is a perspective view of the mouthpiece support/switching valve shown in FIG. 3.
Figure 5:
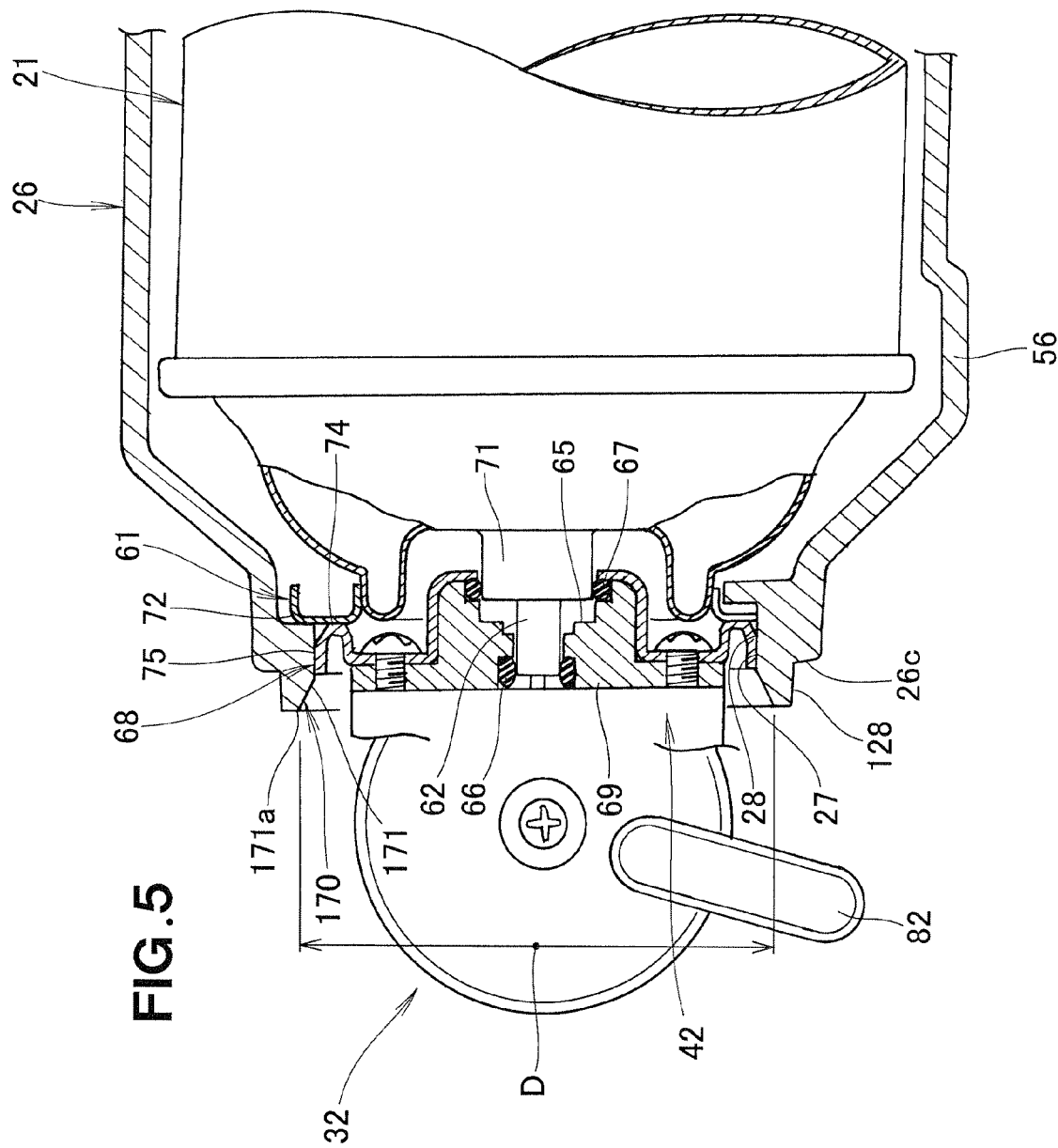
FIG. 5 is a cross-sectional view showing the cassette gas cylinder as being attached to the mouthpiece support/switching valve of FIG. 2.
Figure 7:
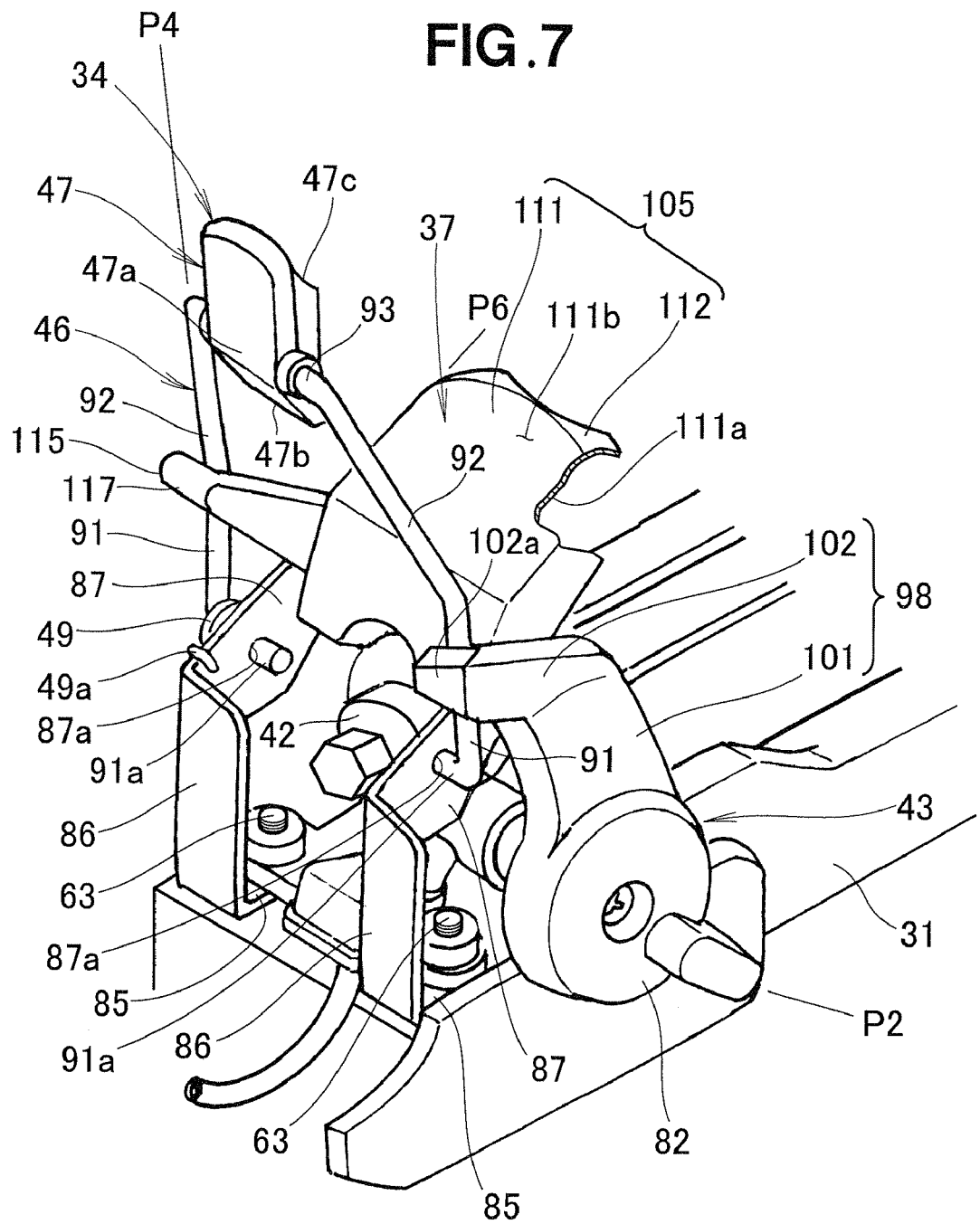
FIG. 7 is an enlarged view of area 7 in FIG. 3.

The mouthpiece support/switching valve 32 is a member in which a mouthpiece support 42 for supporting a mouthpiece 61 of the cassette gas cylinder 21 and a switching valve 43 for opening and closing a fuel passage (not shown) of the mouthpiece support 42 are integrally formed, as shown in FIGS. 4 and 5. The mouthpiece support/switching valve 32 is mounted to the distal end 31a of the receiver body 31 by a pair of left and right bolts 63 (the left bolt 63 is shown in FIG. 7).

The mouthpiece support 42 supports the mouthpiece 61 of the cassette gas cylinder 21. The mouthpiece support 42 comprises a nozzle receiver (opening) 65 provided coaxially, inner and outer O rings 66, 67 provided inside the nozzle receiver 65, and a flange holder 68 provided coaxially with the nozzle receiver 65.

The nozzle receiver 65 is a concavity for receiving a nozzle 62 of the cassette gas cylinder 21. The inner O ring 66 is an annular seal which comes in contact with the nozzle 62 of the cassette gas cylinder 21. The outer O ring 67 is an annular seal which comes in contact with a nozzle support 71 of the cassette gas cylinder 21.

The flange holder 68 is made to protrude outward in an annular shape from a base 69 of the mouthpiece support 42, and is formed into a substantial U shape in cross section. The flange holder 68 comprises a crownpiece 74 for supporting a flange 72 of the mouthpiece 61, and an external peripheral wall 75 capable of fitting into an internal peripheral wall 28 (see FIG. 8 also) of the gas cylinder case 26. The internal peripheral wall 28 of the gas cylinder case 26 is a wall in which an opening 27 (see FIG. 8 also) of the gas cylinder case 26 is formed.

The crownpiece 74 supports the mouthpiece 61 by being in contact with the flange 72 of the mouthpiece 61. The external peripheral wall 75 closes (hermetically seals) the opening 27 of the gas cylinder case 26 by fitting into the internal peripheral wall 28 of the gas cylinder case 26.

The switching valve 43 is provided with a cock body 81 formed integrally with the mouthpiece support 42, and a valve body (not shown) inside the cock body 81, wherein an operating lever 82 is provided to the valve body. The operating lever 82 is switched to a fuel supply position P1 (see FIG. 6), thereby positioning the valve body so as to open a fuel passage inside the cock body 81. In this state, the switching valve 43 is held in a fuel supply state for supplying fuel in the gas cylinder case 26 to the gas engine 12 (see FIG. 1).

The valve body is positioned so as to close the fuel passage in the cock body 81 by switching the operating lever 82 to a fuel-stopping position P2 (see FIG. 7). In this state, the switching valve 43 is held in a fuel-stopping state in which the supply of fuel to the gas engine 12 is stopped.

Figure 6:
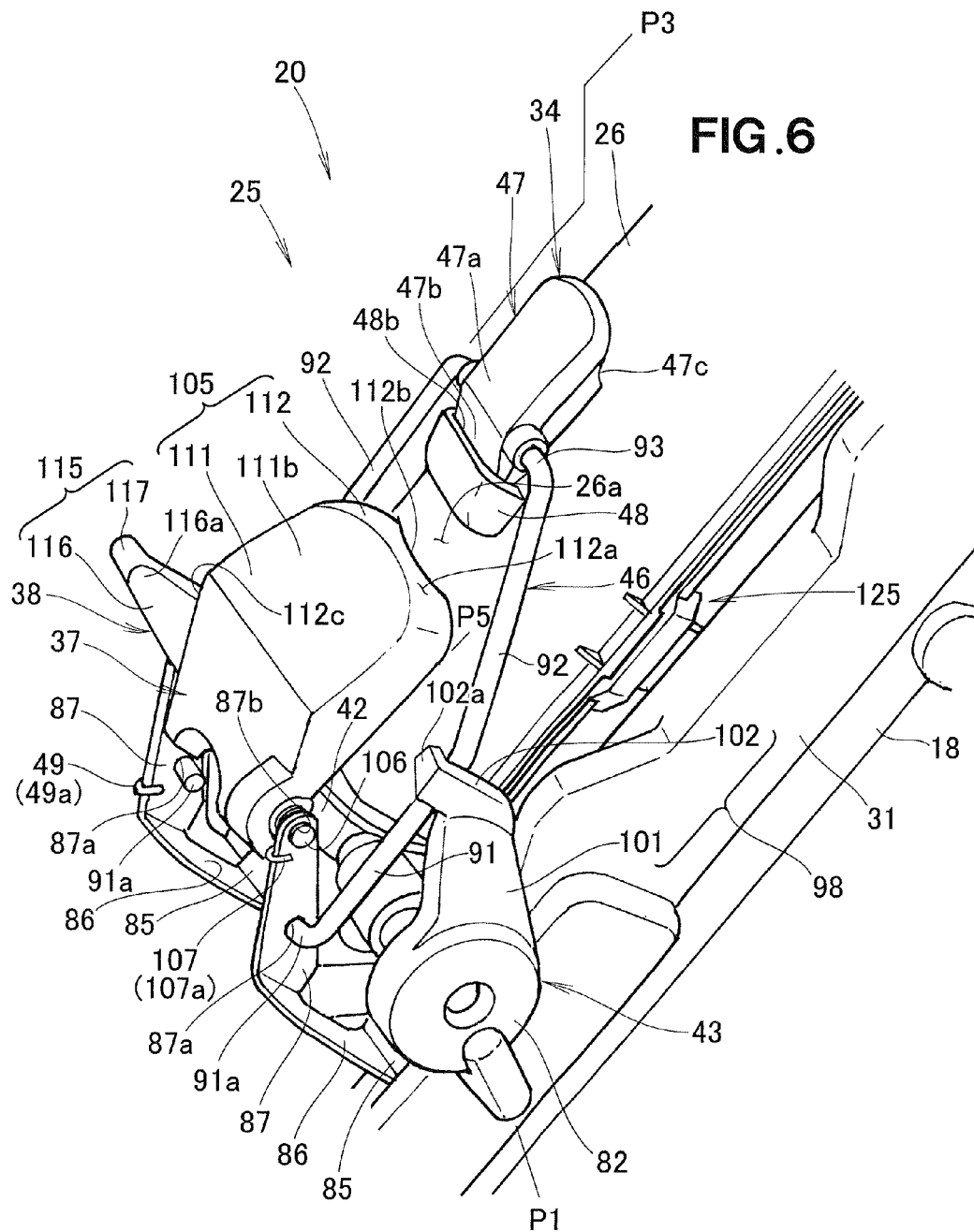
FIG. 6 is an enlarged view of area 6 in FIG. 2.

In FIGS. 6 and 7, the support bracket 33 is integrally formed by bending a flat plate, and is made to support the case-holding means 34 and the shutter member 37.

The support bracket 33 comprises a base 85 attached to the front end of the receiver body 31 by a pair of left and right bolts 63, left and right holding force generators 86, 86 rising from the left and right ends of the base 85, and left and right extensions 87, 87 extending at an upward incline toward the rear of the vehicle body from the left and right holding force generators 86.

The left and right holding force generators 86 are leaf spring shaped regions capable of elastically deforming towards the cassette gas cylinder 21 (the gas cylinder case 26) in a state in which the gas cylinder case 26 is held by the case-holding means 34. Holding force for holding the gas cylinder case 26 in the receiver mechanism 25 can be created by the left and right holding force generators 86 elastically deforming towards the cassette gas cylinder 21.

Left and right front attachment holes 87a are formed in the respective front ends of the left and right extensions 87, and left and right rear attachment holes 87b (only the left rear attachment hole 87b is shown in FIG. 6) are formed in the respective rear ends. The case-holding means 34 is rotatably supported in the left and right front attachment holes 87a. The shutter member 37 is rotatably supported in the left and right rear attachment holes 87b. The left and right rear attachment holes 87b are disposed above the mouthpiece support 42 (see FIG. 12A also). Consequently, the rotational center of the shutter member 37 is disposed above the mouthpiece support 42.

The case-holding means 34 comprises a holding rod 46 rotatably provided in the left and right front attachment holes 87a of the support bracket 33, a locking fastener 47 rotatably provided in the holding rod 46, and a spring member 49 for urging the holding rod 46 toward the gas cylinder case 26. The case-holding means 34 is a means which can be switched between a state of holding the cassette gas cylinder 21 (the gas cylinder case 26) in the receiver body 31 and the mouthpiece support/switching valve 32, and a state of releasing its hold on the cassette gas cylinder 21 (the gas cylinder case 26).

In the holding rod 46, proximal ends 91a of left and right leg parts 91 are rotatably supported in left and right front attachment holes 87a, left and right inclined parts 92 extend respectively from the distal ends of the left and right leg parts 91, and the distal ends of the left and right inclined parts 92 are linked together by a linking part 93. The left and right leg parts 91 are positioned on the external side of the gas cylinder case 26. The left and right inclined parts 92 extend upward and toward the center from the external side of the gas cylinder case 26. Extending the left and right inclined parts 92 upward and toward the center allows the linking part 93 to be disposed on the catch 48 of the gas cylinder case 26.

The spring member 49 is an elastic member for urging the holding rod 46 toward the gas cylinder case 26. In the proximal end 91a of the right leg parts 91, the spring member 49 is wound between the right extension 87 and the right leg part 91, wherein one end 49a is locked to the right extension 87, and the other end (not shown) is locked to the right leg part 91.

The locking fastener 47 comprises a distal end 47a rotatably provided to the linking part 93 of the holding rod 46, a locking end (distal end) 47b capable of locking with the catch 48, and a latch 47c which the operator uses with his finger. The locking end 47b can be locked to the catch 48 of the gas cylinder case 26 while the holding rod 46 remains in a holding position P3. The operator uses his finger on the latch 47c to lift up the locking fastener 47, whereby the locking fastener 47 can be released from the holding position.

With the left and right holding force generators 86 of the support bracket 33 for supporting the case-holding means 34 thus provided, the cassette gas cylinder 21 (the gas cylinder case 26) can be held by the elastic deformation of the left and right holding force generators 86. The elastic deformation of the left and right holding force generators 86 creates force (hereinbelow referred to as return force) that acts as to return the left and right holding force generators 86 to their original positions. The return force of the left and right holding force generators 86 can thereby be used on the cassette gas cylinder 21 via the gas cylinder case 26, reliably holding the cassette gas cylinder 21.

Furthermore, part of the support bracket 33 (i.e., the left and right holding force generators 86) can also be used as elastically deforming parts, and the spring member needed in order to hold the cassette gas cylinder 21 (the gas cylinder case 26) can be dispensed with. The number of components can thereby be reduced, the configuration can be simplified, and costs can be curtailed.

The valve-interlocking means 35 comprises a driven part 98 protruding from the operating lever 82. The driven part 98 comprises a driven base 101 extending from the operating lever 82 toward the left leg part 91, and a driven locking part 102 provided to the driven base 101. The driven locking part 102 is formed into a substantial L shape, and the driven locking part 102 has a bent piece 102a capable of locking with the left leg part 91 from the front of the vehicle body.

The valve-interlocking means 35 causes the bent piece 102a to come in contact with the left leg part 91 when the operating lever 82 is switched to the fuel supply position P1 (see FIG. 6) while the cassette gas cylinder 21 remains held by the case-holding means 34. From this state, the case-holding means 34 (i.e., the holding rod 46) can be moved toward a releasing position P4 (see FIG. 7) where the hold on the cassette gas cylinder 21 is released, and the bent piece 102a can be moved by the left leg part 91, causing the operating lever 82 to interlock with the fuel-stopping position P2 (see FIG. 7). In other words, providing the valve-interlocking means 35 makes it possible to switch the switching valve 43 from a fuel-supplying state to a fuel-blocking state in conjunction with the movement of the holding rod 46 when the hold on the cassette gas cylinder 21 by the case-holding means 34 is released.

The shutter member 37 comprises a shutter body 105 for closing the mouthpiece support 42, a support pin (support axle) 106 for attaching the shutter body 105 to the left and right extensions 87 (i.e., the left and right rear attachment holes 87b), and a shutter spring member 107 for urging the shutter body 105 toward the mouthpiece support 42.

The shutter spring member 107 is an elastic member for urging the shutter member 37 toward a closing position P5 (see FIG. 6) for closing the mouthpiece support 42. The shutter spring member 107 is a spring member wound within the region of the support pin 106 between the left extension 87 and the shutter member 37, wherein one end 107a is locked to the left extension 87, and the other end (not shown) is locked to the shutter member 37.

The shutter body 105 is a member for closing off the mouthpiece support 42 by the urging force of the shutter spring member 107 (described hereinafter) when the cassette gas cylinder 21 (the gas cylinder case 26) is removed from the receiver mechanism 25, the shutter body 105 being rotatably supported at the front end in the left and right rear attachment holes 87b via the support pin 106. The shutter body 105 comprises a substantially rectangular plate part 111 for closing off the mouthpiece support 42, and a peripheral wall 112 provided around the peripheral edge of the plate part 111.

The peripheral wall 112 protrudes toward a back surface 111a of the plate part 111, and a concavity 112b is formed in a rear wall 112a. The concavity 112b is formed into a concave shape along a top wall 26a of the gas cylinder case 26. Consequently, the concavity 112b can be made to fit with the top wall 26a of the gas cylinder case 26. In this state, the peripheral wall 112 comes in contact with the top wall 26a of the gas cylinder case 26. The back surface 111a of the plate part 111 can thereby be held in a substantial hermetic seal against the peripheral wall 112 and the top wall 26a of the gas cylinder case 26 to prevent sand, dust, and other impurities from adhering to the back surface 111a of the plate part 111.

As previously described, the left and right rear attachment holes 87b are disposed above the mouthpiece support 42, whereby the support pin 106 is also disposed above the mouthpiece support 42. Consequently, the shutter body 105 is capable of opening and closing (closing off as well as opening up) the mouthpiece support 42 from above the mouthpiece support 42. Dirt and other impurities can thereby be prevented from penetrating into (adhering to) the nozzle receiver 65 of the mouthpiece support 42.

The support pin 106 of the shutter member 37 is provided above the mouthpiece support 42. Consequently, while the shutter member 37 remains opened, a front surface 111b of the plate part 111 is disposed upward, and the back surface 111a of the plate part 111 is disposed downward. Facing the back surface 111a of the plate part 111 downward prevents sand, dust, and other impurities from adhering to the back surface 111a of the plate part 111.

Additionally, the peripheral wall 112 is provided to the peripheral edge of the plate part 111, and the peripheral wall 112 can be brought in contact with the top wall 26a of the gas cylinder case 26 in a state in which the concavity 112b is fitted with the top wall 26a of the gas cylinder case 26. Consequently, the back surface 111a of the plate part 111 can be kept in a substantially hermetically sealed state against the peripheral wall 112 and the top wall 26a of the gas cylinder case 26 to prevent sand, dust, and other impurities from adhering to the back surface 111a of the plate part 111.

Sand, dust, and other impurities can thus be prevented from adhering to the back surface 111a of the plate part 111, and hence from penetrating into the mouthpiece support 42 (particularly the nozzle receiver 65 shown in FIG. 4), when the mouthpiece support 42 is closed off by the back surface 111a of the shutter member 37.

The shutter-interlocking means 38 is means for switching the shutter member 37 to the open state in conjunction with the releasing operation when the hold on the cassette gas cylinder 21 (the gas cylinder case 26) is released by the case-holding means 34. The shutter-interlocking means 38 has a locking member 115 capable of locking with the right leg part 91 of the case-holding means 34.

The locking member 115 comprises a protrusion 116 rising from the peripheral wall 112 of the shutter member 37 (i.e., the front end of a right side wall 112c), and a projection 117 protruding substantially horizontally from a crownpiece 116a of the protrusion 116 toward the right leg part 91. The projection 117 is formed so as to be capable of coming in contact with the right leg part 91 from the front of the vehicle body. The locking member 115 is formed integrally on the shutter member 37, whereby the urging force of the shutter spring member 107 can be used so as to lock the projection 117 to the right leg part 91 from the front of the vehicle body.

In this state, when the case-holding means 34 is operated and the hold on the cassette gas cylinder 21 is switched to the released state (the releasing position P4), the shutter-interlocking means 38 can act in conjunction with the operation of the case-holding means 34 and switch the shutter member 37 to the opened state (an opened position P6 (see FIG. 7)).

Furthermore, with a simple configuration merely involving the locking member 115, the shutter member 37 can be switched to the opened state in conjunction with the operation of the case-holding means 34.

Figure 8:
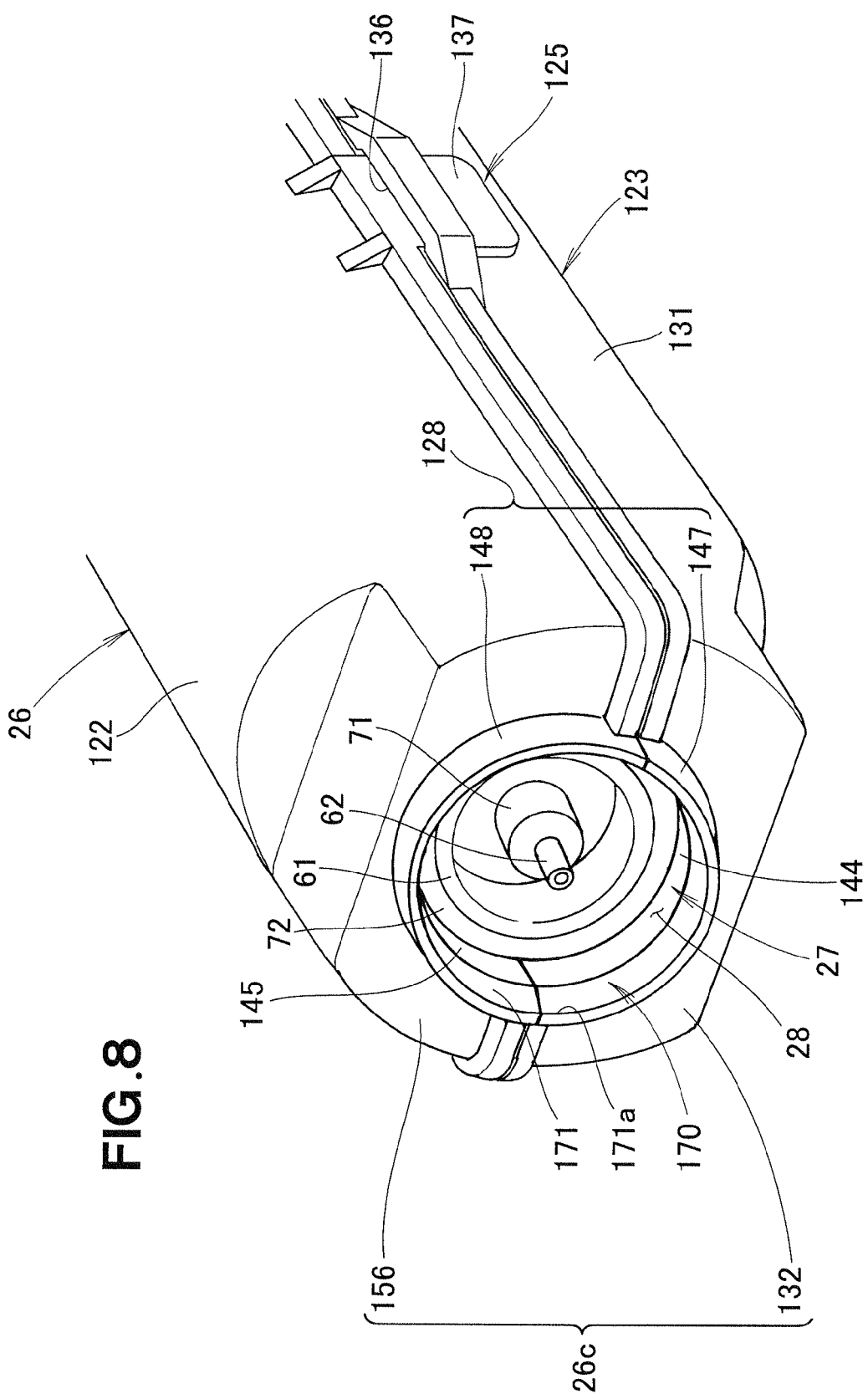
FIG. 8 is a perspective view showing part of the gas cylinder case shown in FIG. 3.
Figure 9:
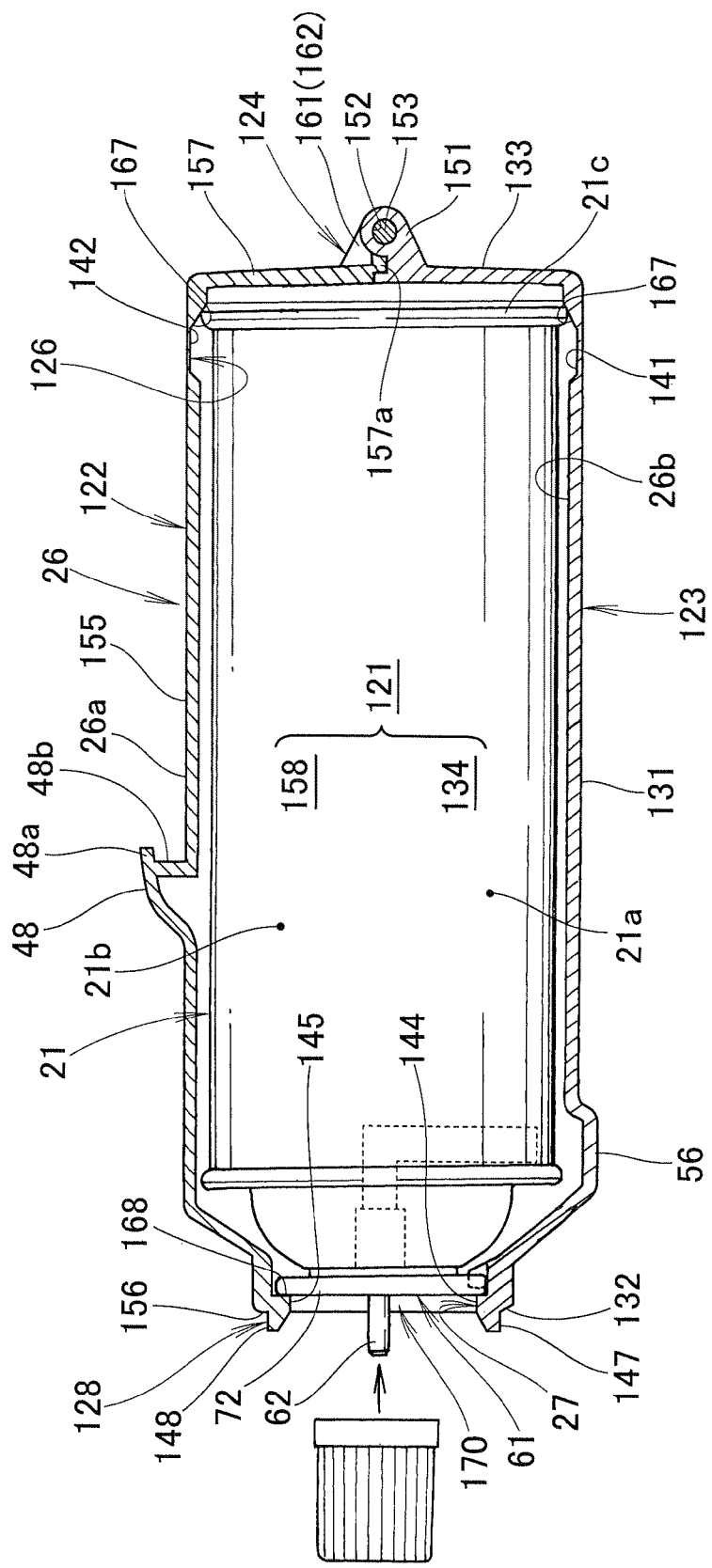
FIG. 9 is a cross-sectional view of the cassette gas cylinder being housed in the gas cylinder case.

Referring to FIGS. 8 and 9, the gas cylinder case 26 is a case formed into a substantially cylindrical hollow body and comprising an internal space 121 capable of housing the cassette gas cylinder 21, and the gas cylinder case 26 can be attached to and removed from the receiver mechanism 25.

The gas cylinder case 26 comprises top and bottom half cases (a pair of case parts) 122, 123 divided into two top and bottom parts, a hinge 124 for linking the top and bottom half cases 122, 123 in a manner that allows them to open and close, locking means 125 for holding the top and bottom half cases 122, 123 in a closed state, an annular groove 126 for holding the cassette gas cylinder 21, an opening 27 for exposing the mouthpiece 61 of the cassette gas cylinder 21 to the case exterior, and an annular bulging part 128 provided along the peripheral edge of the opening 27.

The locking means 125 comprises left and right locking holes 136 (only the left locking hole 136 is shown) provided to the bottom half case 123, and left and right locking pawls 137 (only the left locking pawl 137 is shown) provided to the top half case 122.

The annular groove 126 comprises a bottom annular groove 141 provided to the bottom half case 123 and constituting the bottom half of the annular groove 126, and a top annular groove 142 provided to the top half case 122 and constituting the top half of the annular groove 126.

The opening 27 comprises a bottom open concavity 144 provided to the bottom half case 123 and constituting the bottom half of the opening 27, and a top open concavity 145 provided to the top half case 122 and constituting the top half of the opening 27.

The annular bulging part 128 comprises a bottom arcuate bulging part 147 provided to the bottom half case 123 and constituting the bottom half of the annular bulging part 128, and a top arcuate bulging part 148 provided to the top half case 122 and constituting the top half of the annular bulging part 128. The locking means 125, the annular groove 126, the opening 27, and the annular bulging part 128 are described in detail hereinafter.

The bottom half case 123 comprises a bottom peripheral wall 131 formed into a substantially semicircular arc in cross section and opened upward, a bottom front wall 132 formed in the front end of the bottom peripheral wall 131, and a bottom rear wall 133 formed in the rear end of the bottom peripheral wall 131.

The bottom peripheral wall 131 is formed into a substantially semicircular arc in cross section and is opened upward, and thereby comprises a bottom space 134 capable of housing a bottom half 21a of the cassette gas cylinder 21. The bottom peripheral wall 131 comprises a projection 56 bulging downward from the front end bottom part, and left and right sliders 59 (see FIG. 10) extending from the rear end left side and the rear end right side. The projection 56 is a region located on the bottom part 51 of the receiver body 31, as shown in FIG. 3. The left and right sliders 59 are fitted respectively with left and right slider guides 58 (only the right slider guide 58 is shown in FIG. 3) of the receiver body 31 to allow the gas cylinder case 26 to be attached to the receiver body 31 in a detachable manner.

In the bottom peripheral wall 131, left and right locking holes 136 (only the left locking hole 136 is shown) are provided to the left and right edges near the front end in the substantial center, and a bottom annular groove 141 is provided in the internal peripheral wall of the rear end.

The bottom open concavity 144 is provided in the bottom front wall 132, and the bottom bulging part 147 is provided along the peripheral edge of the bottom open concavity 144.

A bottom hinge 151 of the hinge 124 is provided to the bottom rear wall 133. In the bottom hinge 151, a bottom through-hole 152 (see FIG. 10 also) is formed along the top edge of the bottom rear wall 133. The bottom through-hole 152 is a hole through which a hinge pin 153 can be inserted.

The top half case 122 comprises a top peripheral wall 155 formed into a substantially semicircular arc in cross section and opened downward, a top front wall 156 formed in the front end of the top peripheral wall 155, and a top rear wall 157 formed in the rear end of the top peripheral wall 155.

The top peripheral wall 155 is formed into a substantially semicircular arc in cross section and is opened downward, and thereby comprises a top space 158 capable of housing a top half 21b of the cassette gas cylinder 21. The top peripheral wall 155 comprises the catch 48, which protrudes from the top wall 26a of the gas cylinder case 26. The catch 48 has a catching concavity 48b formed in the rear end 48a. The locking end 47b (see FIG. 6) of the locking fastener 47 locks with the catching concavity 48b, whereby the gas cylinder case 26 can be held in the receiver mechanism 25 shown in FIG. 6.

In the top peripheral wall 155, the left and right locking pawls 137 are provided on the left and right edges near the front end in the substantial center, and the top annular groove 142 is provided in the internal peripheral wall of the rear end.

The top open concavity 145 is provided in the top front wall 156, and the top arcuate bulging part 148 is provided along the peripheral edge of the top open concavity 145. A top hinge 161 of the hinge 124 is provided to the top rear wall 157. The top hinge 161 comprises left and right top hinges 162 (see FIG. 10 also) in the left and right ends of a bottom edge 157a of the top rear wall 157. The left and right top hinges 162 have respective left and right top through-holes 163 (FIG. 10) formed coaxially with the bottom through-hole 152. The left and right top through-holes 163 are holes through which the hinge pin 153 can be inserted.

The locking means 125 comprises the left and right locking holes 136 provided to the bottom half case 123, and the left and right locking pawls 137 provided to the top half case 122. The left locking pawl 137 is locked with the left locking hole 136, and the right locking pawl 137 is locked with the right locking hole 136, whereby the top and bottom half cases 122, 123 can be held in a closed state.

The opening 27 is formed in a front wall (the top and bottom front walls 156, 132) 26c (FIG. 8) of the gas cylinder case 26, and is disposed coaxially with the cassette gas cylinder 21. The opening 27 is formed to be smaller in diameter than the mouthpiece 61 (i.e., the flange 72) of the cassette gas cylinder 21. An annular contact part 168 capable of coming in contact with the flange 72 of the cassette gas cylinder 21 is thereby formed in the front wall 26c of the gas cylinder case 26.

The annular groove 126 is configured from the bottom annular groove 141 and the top annular groove 142, and is provided to the rear end of a case internal peripheral wall 26b of the gas cylinder case 26. The annular groove 126 is formed into an annular inclined wall 167 whose rear wall gradually expands in diameter as it progresses forward. A bottom part 21c of the cassette gas cylinder 21 is in contact with the inclined wall 167. The annular inclined wall 167 is a wall for pushing the bottom part 21c of the cassette gas cylinder 21 forward (toward the distal end) when the top and bottom half cases 122, 123 are closed.

The bottom part 21c of the cassette gas cylinder 21 is pushed forward (toward the distal end) by the inclined wall 167, whereby the mouthpiece 61 (i.e., the flange 72) of the cassette gas cylinder 21 is brought in contact with the contact part 168 of the gas cylinder case 26, and the cassette gas cylinder 21 is held inside the gas cylinder case 26.

Referring again to FIG. 5, the annular bulging part 128 is formed into an annular shape along the peripheral edge of the opening 27, coaxially with the opening 27 in the front wall 26c of the gas cylinder case 26 (see FIGS. 8 and 9 also). The internal periphery of the annular bulging part 128 is provided with a fitting concavity 170 coaxial with the gas cylinder case 26. The fitting concavity 170 is formed into a tapered shape so that an internal peripheral wall (internal wall) 171 gradually expands in diameter toward a distal end 171a. Forming the internal peripheral wall 171 into a tapered shape makes it possible for the mouthpiece 61 of the cassette gas cylinder 21 to be guided coaxially in relation to the mouthpiece support 42 (FIG. 4). Furthermore, forming the internal peripheral wall 171 into a tapered shape makes it possible to ensure (form) a large inside diameter D in the distal end 171a of the fitting concavity 170. Consequently, when the gas cylinder case 26 is attached to the receiver mechanism 25 (FIG. 3), the mouthpiece 61 can be guided coaxially in relation to the mouthpiece support 42 merely by aligning the tapered internal peripheral wall 171 with the mouthpiece support 42.

Furthermore, forming the internal peripheral wall 171 into a tapered shape ensures a large inside diameter D in the distal end 171a of the fitting concavity 170. The mouthpiece 61 of the cassette gas cylinder 21 housed in the gas cylinder case 26 can thereby be attached in a simple manner to the mouthpiece support 42 with little effort.

Figure 10:
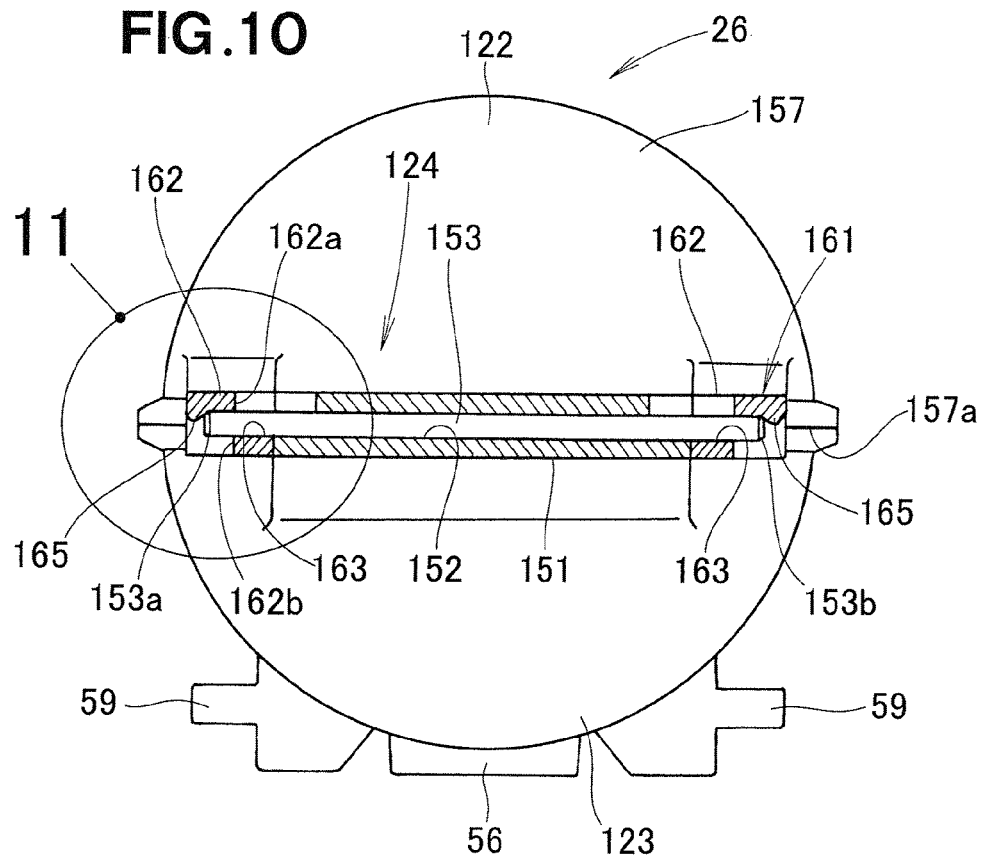
FIG. 10 is a partial cross-sectional view showing the hinge of the gas cylinder case shown in FIG. 9.
Figure 11:
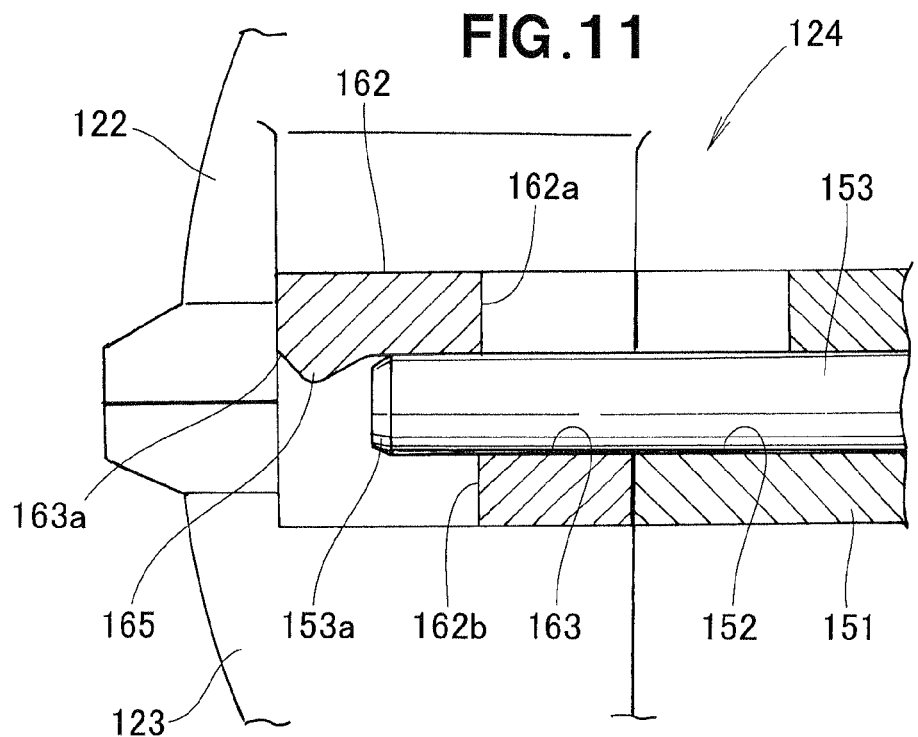
FIG. 11 is an enlarged view of area 11 in FIG. 10.

The hinge 124 comprises a bottom hinge 151 provided to the bottom rear wall 133 of the bottom half case 123, a top hinge 161 (left and right top hinges 162) provided to the top rear wall 157 of the top half case 122, a hinge pin 153 for rotatably linking the top and bottom hinges 161, 151, and left and right stopping projections (stoppers) 165 for preventing the hinge pin 153 from falling out, as shown in FIGS. 10 and 11.

A top through-hole 163 is formed in left top hinge 162, an inner notch 162a (see FIG. 2 also) is formed in the center in the top, an outer notch 162b (see FIG. 2 also) is formed in the outward side in the bottom, and the left stopping projection 165 is formed in an outer end 163a of the top through-hole 163. The left stopping projection 165 is provided in the outer end 163a of the top through-hole 163, in a region opposite (facing) the outer notch 162b.

Forming the inner notch 162a and the outer notch 162b in the left top hinge 162 and providing the left stopping projection 165 to a region opposite (facing) the outer notch 162b makes it possible to mold the top through-hole 163 and to mold the left stopping projection 165 when the left top hinge 162 is extrusion-molded from a resin. The left top hinge 162 comprising the left stopping projection 165 can thereby be easily molded. The right top hinge 162 is a member bilaterally symmetrical to the left top hinge 162, and the components are denoted by the same symbols as those of the left top hinge 162 and are not described.

In this hinge 124, the bottom hinge 151 is provided coaxially between both the left and right top hinges 162, and the hinge pin 153 is inserted through the left and right top through-holes 163 of the left and right top hinges 162 and the bottom through-hole 152 of the bottom hinge 151. Consequently, the left and right top hinges 162 and the bottom hinge 151 are rotatably supported with the hinge pin 153 as an axis.

The left and right stopping projections 165 are provided to the respective top through-holes 163 of the left and right top hinges 162. The left stopping projection 165 is provided in the vicinity of a left end 153a of the hinge pin 153, and the right stopping projection 165 is provided in the vicinity of a right end 153b of the hinge pin 153. Consequently, the left and right stopping projections 165 can be brought in contact with the left and right ends 153a, 153b of the hinge pin 153. The hinge pin 153 can thereby be prevented from falling out of the hinge 124 by the left and right stopping projections 165, and the usability can be improved.

Next, an example of attaching the cassette gas cylinder 21 to the receiver mechanism 25 will be described based on FIGS. 12A through 12G.

Figure 12A:
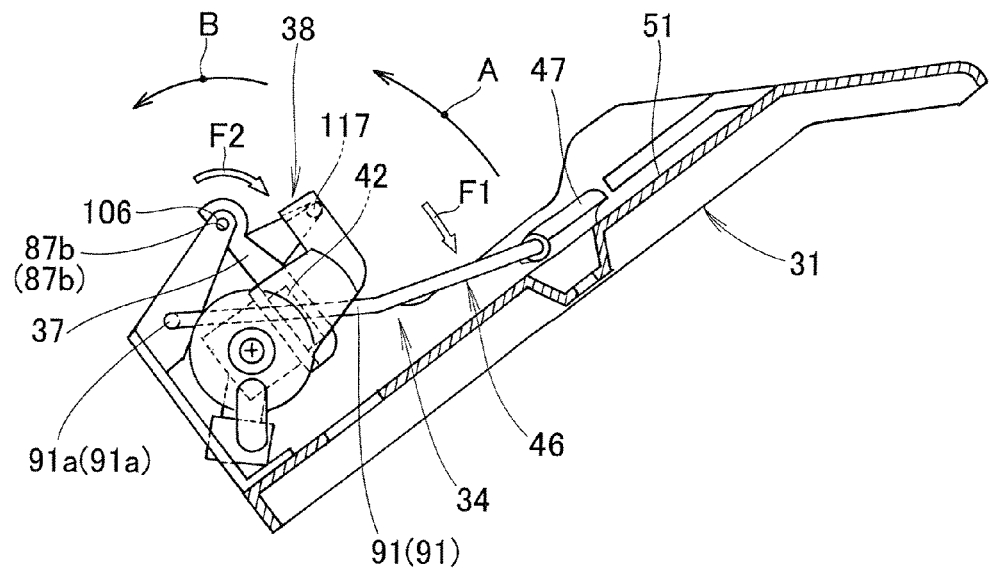
FIGS. 12A and 12B show an example in which the case-holding means of the receiver mechanism is pulled to a retracted position.

In FIG. 12A, the holding rod 46 of the case-holding means 34 is urged toward the bottom part 51 of the receiver body 31 by the spring force F1 of the spring member 49 (FIG. 6). The locking fastener 47 of the holding rod 46 is held in a state of being pressed against the bottom part 51 by the spring member 49.

The shutter member 37 is brought in contact with the mouthpiece support 42 by the spring force F2 of the shutter spring member 107 (FIG. 6). The mouthpiece support 42 is thereby covered by the shutter spring member 107 to prevent sand, dust, and other impurities from penetrating into the mouthpiece support 42 (particularly the nozzle receiver 65).

In this state, swinging (raising) the holding rod 46, as shown by arrow A, about the left and right proximal ends 91a as an axis causes the right leg part 91 of the holding rod 46 to come in contact with the projection 117 of the shutter-interlocking means 38. Continuing to raise the holding rod 46 as shown by arrow A causes the projection 117 to rise in conjunction with the holding rod 46. The shutter member 37 thereby swings (rises), as shown by arrow B, about the support pin 106 as an axis.

Figure 12B:
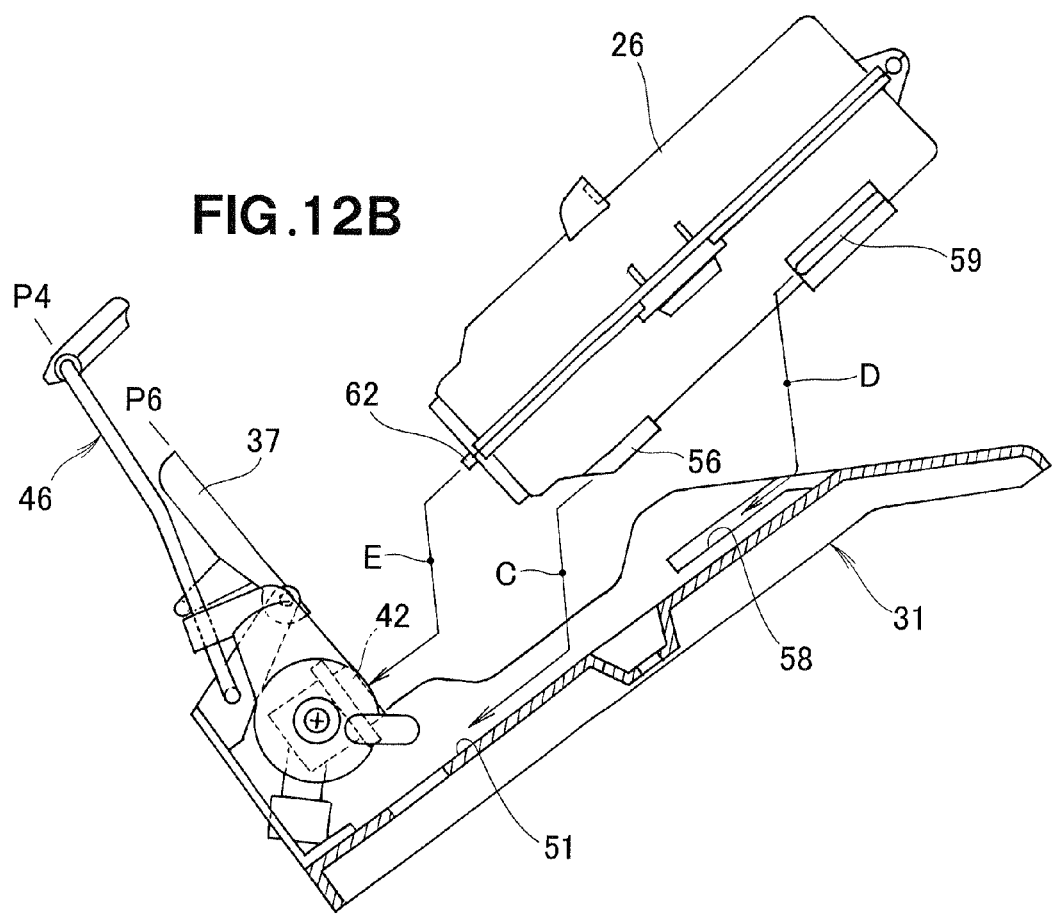

In FIG. 12B, the holding rod 46 retracts to the releasing position P4 above the receiver body 31, and the shutter member 37 moves to the opened position P6. The mouthpiece support 42 is opened by the movement of the shutter member 37 to the opened position P6.

The projection 56 of the gas cylinder case 26 rests on the bottom part 51 of the receiver body 31, as shown by arrow C. At the same time, the left and right sliders 59 (only the left slider 59 is shown) of the gas cylinder case 26 are inserted, as shown by arrow D, into the left and right slider guides 58 (only the right slider guide 58 is shown) of the receiver body 31. The gas cylinder case 26 is thereby attached to the receiver body 31. Attaching the gas cylinder case 26 to the receiver body 31 causes the cassette gas cylinder 21 (FIG. 9) in the gas cylinder case 26 to be supported in the mouthpiece support 42, as shown by arrow E.

Figure 12C:
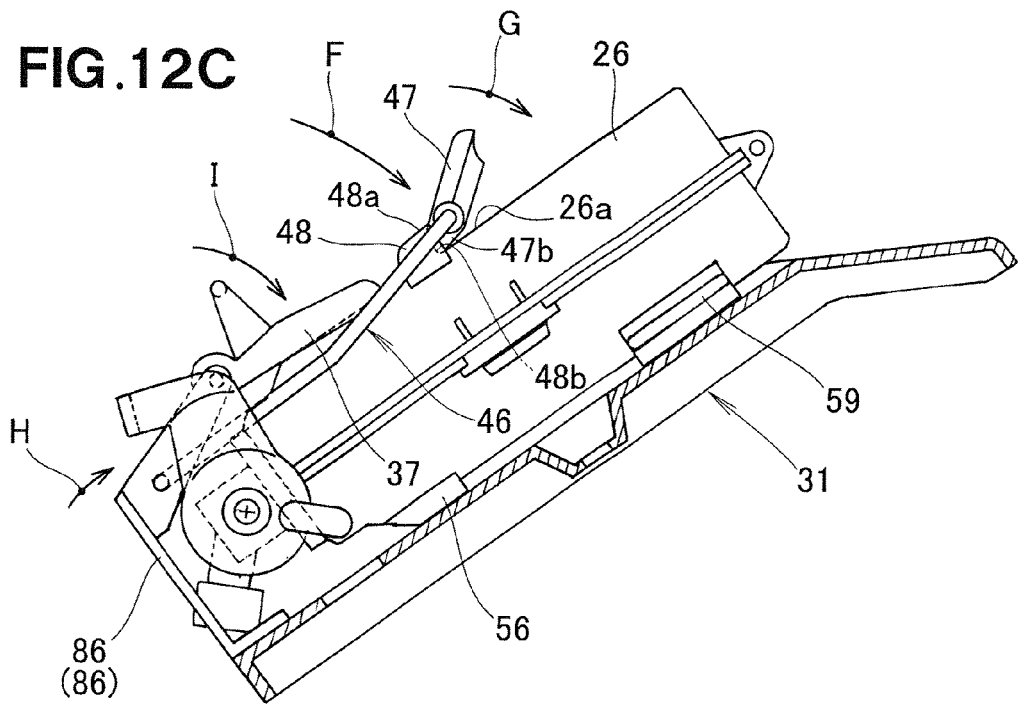
FIGS. 12C and 12D show an example in which the cassette gas cylinder is held in the receiver mechanism.

In FIG. 12C, the holding rod 46 is lowered, as shown by arrow F, by the spring force F1 of the spring member 49 (FIG. 6), and the locking end 47b of the locking fastener 47 comes in contact with the rear end 48a of the catch 48. The locking end 47b is locked to the catching concavity 48b of the catch 48 by the movement of the locking fastener 47, as shown by arrow G. When the locking end 47b is locked to the catching concavity 48b, the left and right holding force generators 86 elastically deform, as shown by arrow H, in the support bracket 33 (FIG. 3).

The holding rod 46 is lowered, as shown by arrow F, by the spring force F1 of the spring member 49 (FIG. 6), whereby the shutter member 37 is lowered, as shown by arrow I, by the spring force F2 of the shutter spring member 107 (FIG. 6). The shutter member 37 comes in contact with the top wall 26a of the gas cylinder case 26, and the shutter member 37 is held in this position of contact by the shutter spring member 107.

Figure 12D:
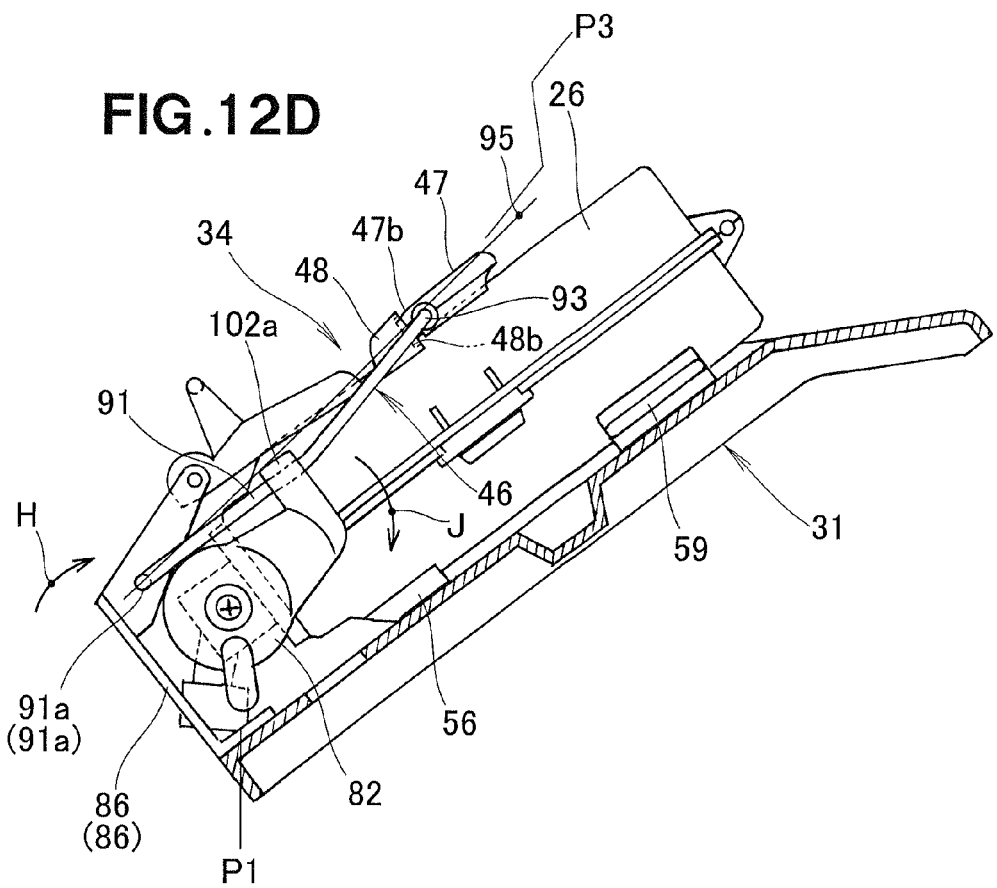

In FIG. 12D, the holding rod 46 falls to the holding position P3, and the gas cylinder case 26 is held by the case-holding means 34. In this state, the linking part 93 is positioned below (near the gas cylinder case 26) a line 95, which joins the locking end 47b and the left and right proximal ends 91a of the holding rod 46, while the locking end 47b of the locking fastener 47 is locked to the catching concavity 48b (see FIG. 9 also).

Additionally, return force is created by the elastic deformation of the left and right holding force generators 86, as shown by arrow H. This return force acts on the locking fastener 47 via the holding rod 46. The locking fastener 47 is pressed against the gas cylinder case 26 by this return force. The locking end 47b is held in a locked state in the catching concavity 48b of the catch 48, and the locking fastener 47 is held in a locked state.

Furthermore, while the locking end 47b remains locked in the catching concavity 48b, the left and right holding force generators 86 elastically deform, and return force is created in the left and right holding force generators 86. This return force acts on the cassette gas cylinder 21 (FIG. 9) via the gas cylinder case 26, thereby making it possible to absorb manufacturing tolerance, assembly tolerance, or the like. The cassette gas cylinder 21 can thereby be reliably brought in contact with the mouthpiece support 42 (see FIG. 12), and the cassette gas cylinder 21 can be reliably held.

While the cassette gas cylinder 21 remains held in the mouthpiece support 42, the operating lever 82 is switched to the fuel supply position P1, as shown by arrow J. The bent piece 102a comes in contact with the holding rod 46 (the left leg part 91) when the operating lever 82 is switched to the fuel supply position P1. Switching the operating lever 82 to the fuel supply position P1 makes it possible to supply the fuel in the cassette gas cylinder 21 (FIG. 9) to the gas engine 12 (FIG. 1).

In FIG. 12E, the operator uses his finger on the latch 47c of the locking fastener 47 to lift up the locking fastener 47 as shown by arrow K, and the locking end 47b of the locking fastener 47 is removed from the catching concavity 48b. The holding rod 46 is swung (raised), as shown by arrow L, about the left and right proximal ends 91a as an axis. The bent piece 102a is moved by the left leg part 91 of the holding rod 46 along with the swinging (rising) of the holding rod 46, and is interlocked with the operating lever 82.

In FIG. 12F, the holding rod 46 is swung (raised), as shown by arrow L, about the left and right proximal ends 91a as an axis, whereby the right leg part 91 of the holding rod 46 comes in contact with the projection 117 of the shutter-interlocking means 38. Continually raising the holding rod 46 as shown by arrow L causes the projection 117 to rise in conjunction with the holding rod 46. Specifically, the shutter member 37 swings (rises), as shown by arrow M, about the support pin 106 as an axis.

Figure 12G:
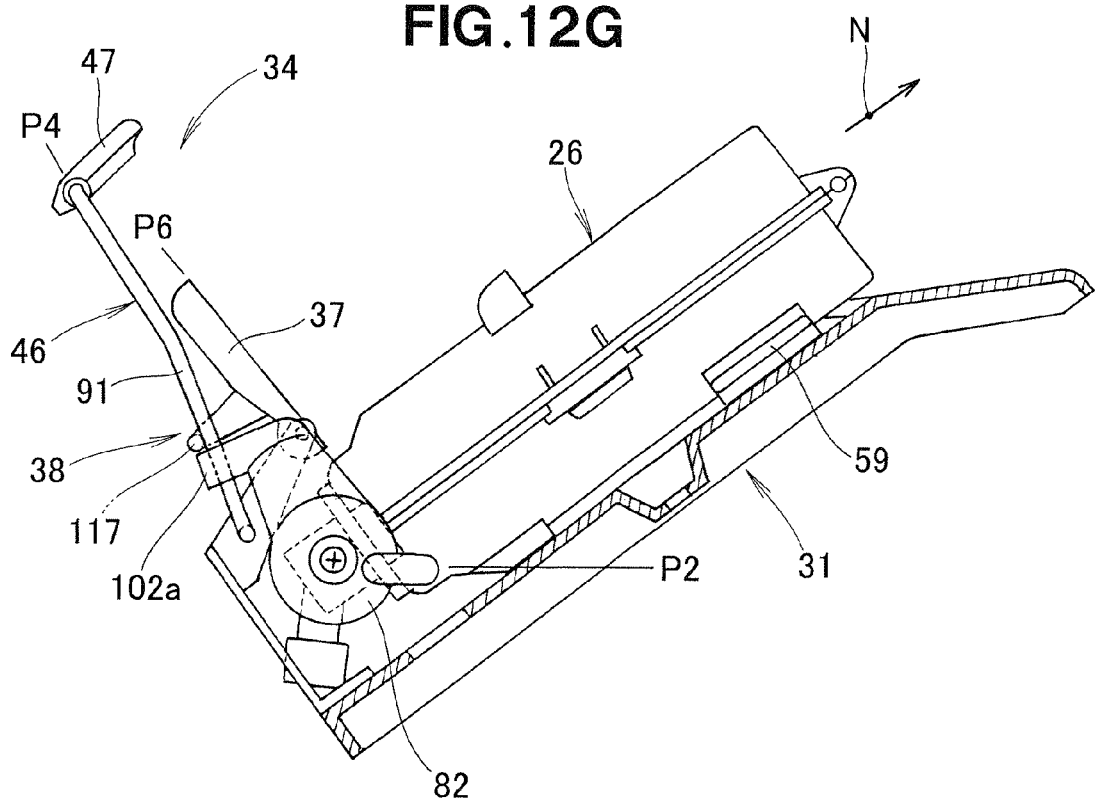

In FIG. 12G, the holding rod 46 retracts to the releasing position P4 above the receiver body 31, and the shutter member 37 retracts to the opened position P6, which is an upper position.

As described above, the shutter-interlocking means 38 moves in conjunction with the operation of the case-holding means 34, and the shutter member 37 can be switched to the opened position P6 when the case-holding means 34 is operated and the hold on the cassette gas cylinder 21 is switched to the released state. It is thereby possible to dispense with the procedure of switching the shutter member 37 to the opened position P6, and usability can be improved.

The bent piece 102a can be moved by the left leg part 91, and the operating lever 82 can be moved in coordinated fashion to the fuel-stopping position P2. Consequently, when the hold on the cassette gas cylinder 21 (FIG. 9) by the case-holding means 34 is released, the operating lever 82 can move in conjunction with the movement of the holding rod 46, and the switching valve 43 (FIG. 4) can be switched from the fuel-supplying state to the fuel-blocking state. There is thereby no need to switch the shutter member 37 to the open state when the gas cylinder case 26 is removed from the receiver body 31. There is also no need to separately operate the switching valve 43 (operating lever 82) and switch it to the fuel-blocking state when the gas cylinder case 26 is removed from the receiver body 31. Therefore, the gas cylinder case 26 can be removed, as shown by arrow N, by a simple operating procedure.

Next, an example in which the mouthpiece 61 of the cassette gas cylinder 21 is supported by the mouthpiece support 42 will be described based on FIGS. 13A through 13D.

In FIG. 13A, the annular bulging part 128 (the fitting concavity 170) of the gas cylinder case 26 is formed into a tapered shape so that the internal peripheral wall 171 gradually expands in diameter toward the distal end 171a. A large inside diameter D is formed in the distal end 171a of the fitting concavity 170 by forming the internal peripheral wall 171 into a tapered shape.

The an axis line 181 of the mouthpiece 61 is assumed to deviate by a distance S from an axial center 180 of the mouthpiece support 42 when the mouthpiece 61 of the cassette gas cylinder 21 is attached to the mouthpiece support 42 as shown by arrow O.

However, even if the axis line 181 of the mouthpiece 61 deviates by a distance S from the axial center 180 of the mouthpiece support 42, as shown in FIG. 13B, the distal end 171a can still fit into the mouthpiece support 42 (i.e., the external peripheral wall 75) because a large inside diameter D is formed in the distal end 171a of the fitting concavity 170.

In FIG. 13C, the internal peripheral wall 171 of the fitting concavity 170 is formed into a tapered shape. Consequently, the mouthpiece 61 can be guided coaxially with the mouthpiece support 42 merely by aligning the tapered internal peripheral wall 171 with the external peripheral wall 75.

In FIG. 13D, the internal peripheral wall 28 of the gas cylinder case 26 fits with the crownpiece 74 of the mouthpiece support 42 and the external peripheral wall 75. The mouthpiece 61 can be supported on the mouthpiece support 42 by bringing the crownpiece 74 of the mouthpiece support 42 into contact with the flange 72 of the mouthpiece 61.

Thus, the mouthpiece 61 of the cassette gas cylinder 21 housed in the gas cylinder case 26 can be attached to the mouthpiece support 42 in a simple manner and with little effort by forming the internal peripheral wall 171 into a tapered shape.

Furthermore, fitting the internal peripheral wall 28 of the gas cylinder case 26 with the external peripheral wall 75 of the mouthpiece support 42 causes the opening 27 of the gas cylinder case 26 to be closed (hermetically sealed) by the external peripheral wall 75. Thus, the mouthpiece support 42 can be covered by the gas cylinder case 26 to prevent sand, dust, and other impurities from penetrating into the mouthpiece support 42 (particularly the nozzle receiver 65).

Next, an example in which the hinge pin 153 is attached to the hinge 124 will be described based on FIGS. 14A through 14D.

Figure 14A:
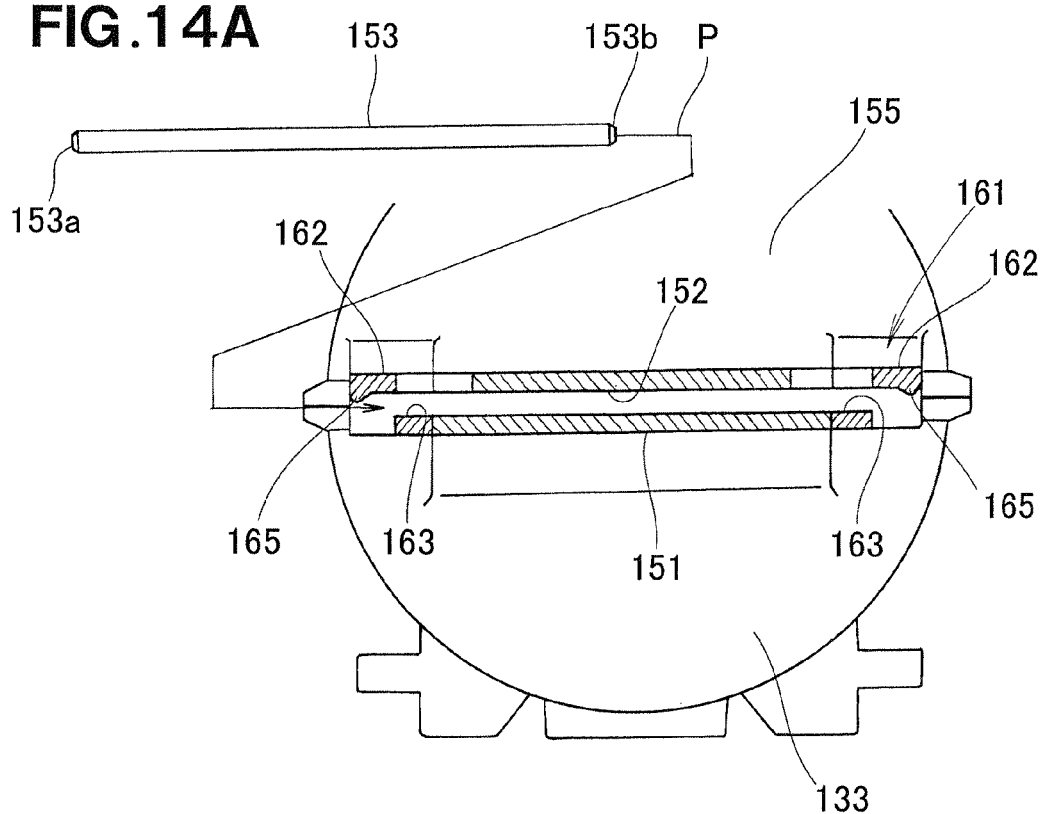
FIGS. 14A through 14D are views showing an example of inserting the hinge pin into the hinge of the gas cylinder case.

In FIG. 14A, the bottom hinge 151 is disposed coaxially between the left and right top hinges 162. In this state, the hinge pin 153 is inserted from the left top hinge 162, as shown by arrow P.

Figure 14B:
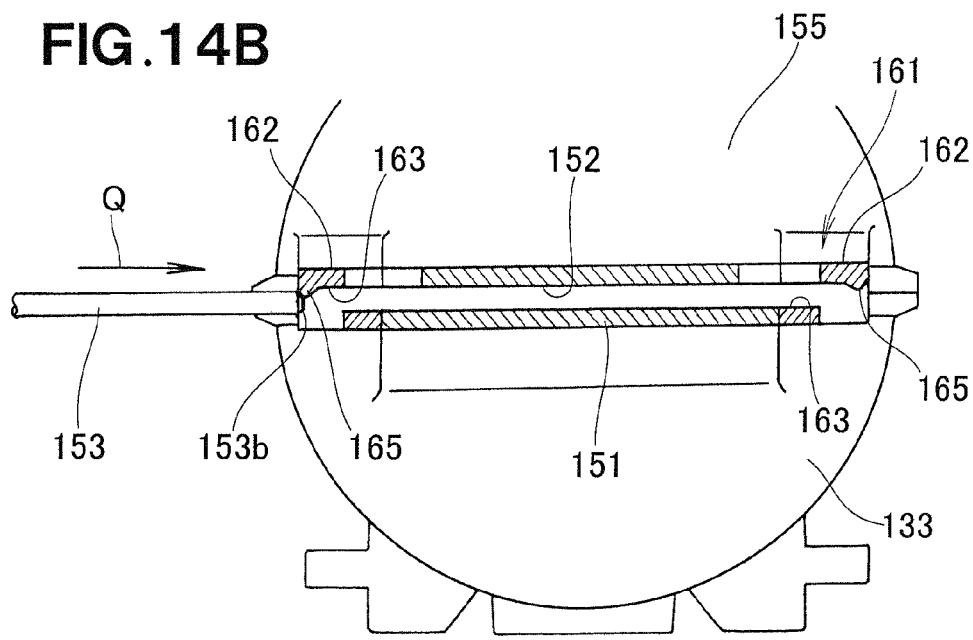

In FIG. 14B, the right end 153b of the hinge pin 153 is inserted into the left top through-hole 163 of the left top hinge 162 and brought in contact with the left stopping projection 165.

The hinge pin 153 is pushed toward the left top through-hole 163, as shown by arrow Q, whereby the left stopping projection 165 is elastically deformed in a collapsible manner by the right end 153b of the hinge pin 153.

Figure 14C:
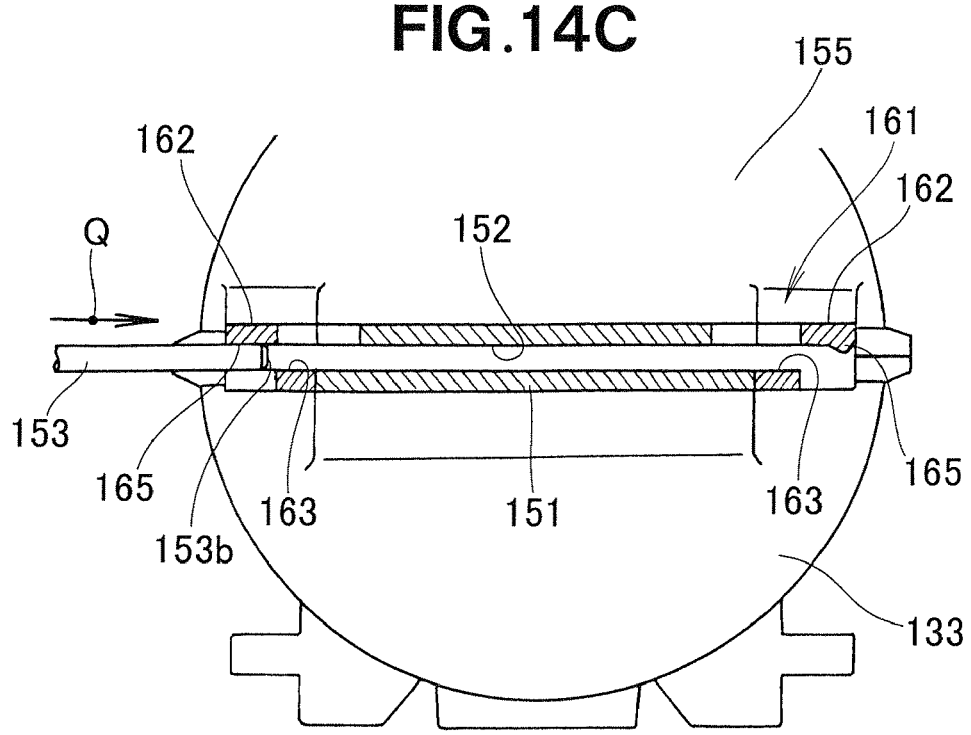

In FIG. 14C, the hinge pin 153 is inserted into the left top through-hole 163, as shown by arrow Q, while the left stopping projection 165 is collapsed (elastically deformed).

Figure 14D:
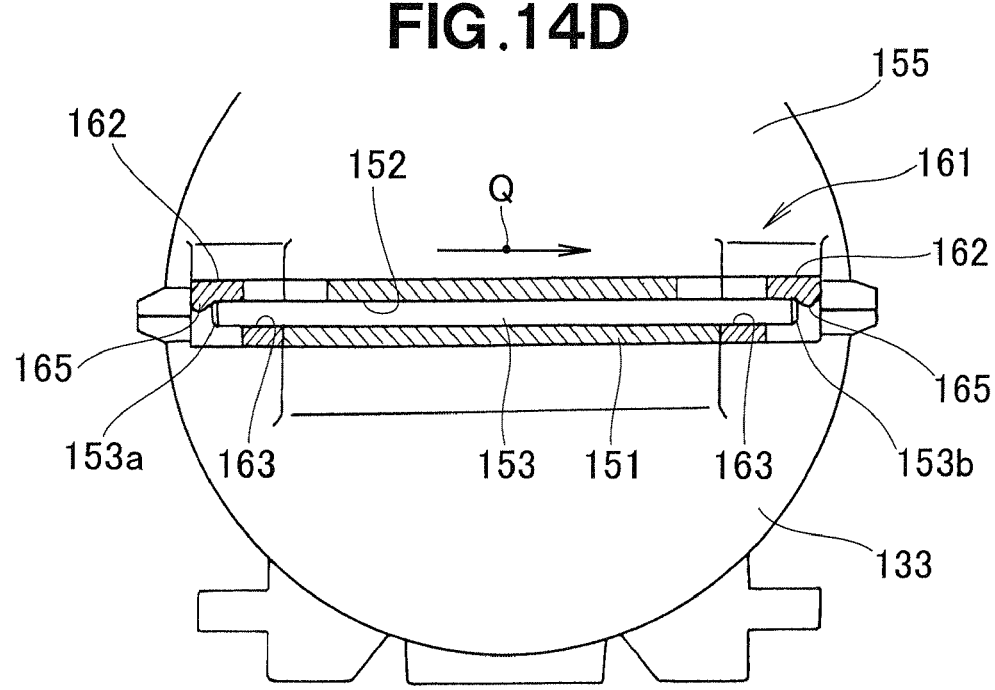

In FIG. 14D, the hinge pin 153 continues to be inserted as shown by arrow Q. The right end 153b of the hinge pin 153 passes via the bottom through-hole 152 of the bottom hinge 151 and reaches the top through-hole 163 of the right top hinge 162. Having reached this through-hole, the right end 153b comes in contact with the right stopping projection 165.

The left end 153a of the hinge pin 153 moves over the left stopping projection 165. The left stopping projection 165 returns from a collapsed state to its original state (a protruding state). The returned left stopping projection 165 comes in contact with the left end 153a of the hinge pin 153. In this state, the top hinge 161 (left and right top hinges 162) and the bottom hinge 151 are linked by the hinge pin 153.

The left stopping projection 165 is provided in the vicinity of the left end 153a of the hinge pin 153, and the right stopping projection 165 is provided in the vicinity of the right end 153b of the hinge pin 153. The hinge pin 153 is thereby prevented from falling out of the hinge 124 by the left and right stopping projections 165, and usability can be improved.

The work vehicle according to the present invention is not limited to the embodiment described above, and can be suitably modified, improved, or otherwise changed. For example, a walk-behind tiller was presented as an example of a work vehicle in the embodiment, but the work vehicle is not limited to this example, and the present invention can also be applied to lawn mowers, outboard engine units, electric power generators, and other work vehicles.

In the embodiment, an example was presented in which a support pin 106 is provided above the mouthpiece support 42, and the support pin 106 is provided with a shutter member 37 for opening and closing the mouthpiece support 42 from above, but the support pin 106 need not be provided above the mouthpiece support 42. For example, even if there is no support pin 106 provided above the mouthpiece support 42, it is still possible to configure the support pin 106 so that the mouthpiece support 42 is opened and closed from above by changing the shape of the shutter member 37.

Furthermore, the cassette gas cylinder 21, the receiver mechanism 25, the gas cylinder case 26, the support bracket 33, the case-holding means 34, the shutter member 37, the shutter-interlocking means 38, the mouthpiece support 42, the mouthpiece 61, the nozzle receiver 65, the left and right holding force generators 86, the locking member 115, the top and bottom half cases 122, 123, the hinge 124, the hinge pin 153, the left and right stopping projections 165, and other components presented in the embodiment are not limited to the shapes described and can be suitably modified.

The present invention is suitable for application in a work vehicle in which a cassette gas cylinder is installed in a cylinder mount, and an engine is driven by fuel supplied form the cassette gas cylinder.

What is claimed is:

1. A work vehicle, comprising:
    a cassette gas cylinder;
    a cylinder mount in which the cassette gas cylinder is installed; and
    an engine driven by fuel supplied from the cassette gas cylinder,
    wherein the cylinder mount comprises a mouthpiece support for supporting a mouthpiece of the cassette gas cylinder, and a shutter member vertically swingable about a support shaft provided to the cylinder mount, for opening and closing an opening in the mouthpiece support from above the mouthpiece support.

2. The work vehicle of claim 1, wherein the cylinder mount further comprises cylinder-holding means capable of switching the cassette gas cylinder between a held state and a released state, and shutter-interlocking means designed to switch the shutter member to an opened state in conjunction with an operation of the cylinder-holding means as the cassette gas cylinder is switched from the held state to the released state.

3. The work vehicle of claim 2, wherein the shutter-interlocking means comprises a locking member capable of locking with the cylinder-holding means disposed in a cassette-gas-cylinder holding position, so that by locking of the locking member with the cylinder-holding means, the shutter member is switched to an open state in conjunction with the operation of the cylinder-holding means as the cassette gas cylinder is switched from the held state to the released state.

4. The work vehicle of claim 2, wherein the cylinder mount comprises a support bracket for supporting the cylinder-holding means, and a holding force generator obtained by making part of the support bracket elastically deformable, and creating elastic deformation in the holding force generator causes a holding force to be generated for holding the cassette gas cylinder in the cylinder mount.

5. The work vehicle of claim 1, wherein the cassette gas cylinder is designed to be housed in a gas cylinder case, the cylinder case being halved into a pair of cases, the pair of cases is linked in an openable and closeable manner by a hinge pin of a hinge provided to the pair of cases, and the hinge has stoppers for preventing the hinge pin from falling out.

* * * * *